US012783081B2

(12) United States Patent
Kim et al.

(10) Patent No.: US 12,783,081 B2
(45) Date of Patent: Nov. 3, 2026

(54) TOUCH INPUT DEVICE

(71) Applicant: HIDEEP INC., Seongnam-si (KR)

(72) Inventors: Seyeob Kim, Seongnam-si (KR); Bonkee Kim, Seongnam-si (KR)

(73) Assignee: HiDeep Inc. (KR)

( * ) Notice: Subject to any disclaimer, the term of this patent is extended or adjusted under 35 U.S.C. 154(b) by 47 days.

(21) Appl. No.: 18/715,703

(22) PCT Filed: Nov. 18, 2022

(86) PCT No.: PCT/KR2022/018274
§ 371 (c)(1),
(2) Date: Jun. 1, 2024

(87) PCT Pub. No.: WO2023/101280
PCT Pub. Date: Jun. 8, 2023

(65) Prior Publication Data

US 2025/0036234 A1 Jan. 30, 2025

(30) Foreign Application Priority Data

Dec. 2, 2021 (KR) ........................ 10-2021-0170886

(51) Int. Cl.
*G06F 3/041* (2006.01)
*G06F 3/0354* (2013.01)
*G06F 3/044* (2006.01)

(52) U.S. Cl.
CPC ...... *G06F 3/04166* (2019.05); *G06F 3/03545* (2013.01); *G06F 3/04162* (2019.05);
(Continued)

(58) Field of Classification Search
CPC ........ G06F 3/041; G06F 3/0354; G06F 3/044; G06F 3/03545; G06F 3/04166;
(Continued)

(56) References Cited

U.S. PATENT DOCUMENTS

2016/0202783 A1* 7/2016 Bell .................... G06F 3/04162 345/173
2017/0083152 A1* 3/2017 Gourevitch ........... G06F 3/0446
2019/0050110 A1* 2/2019 King-Smith .......... G06F 3/0416

FOREIGN PATENT DOCUMENTS

KR 10-2015-0002326 A 1/2015
KR 10-2015-0141067 A 12/2015
(Continued)

OTHER PUBLICATIONS

International Search Report of PCT Application PCT/KR2022/018274 Issued on Mar. 6, 2023.

*Primary Examiner* — Michael A Faragalla
(74) *Attorney, Agent, or Firm* — The Belles Group, P.C.

(57) ABSTRACT

Described is a multi-functional touch input device capable of detecting a touch position, driving a stylus pen, and detecting the position of the stylus pen. The touch input device according to another embodiment of the present invention comprises a sensor unit and a control unit, wherein the sensor unit comprises: a plurality of first patterns extending in a first direction and having one ends electrically connected to the control unit; a plurality of second patterns extending in the first direction and disposed adjacent to the first patterns; a plurality of third patterns extending in a second direction perpendicular to the first direction and having one ends electrically connected to the control unit; and a plurality of fourth patterns extending in the second direction, disposed adjacent to the third patterns, and having one ends electrically floated and the other ends electrically connected to each other.

10 Claims, 15 Drawing Sheets

(52) U.S. Cl.
CPC ........ *G06F 3/04164* (2019.05); *G06F 3/0442* (2019.05); *G06F 3/0446* (2019.05)

(58) Field of Classification Search
CPC .. G06F 3/0442; G06F 3/0446; G06F 3/04164; G06F 3/04162; G06F 3/0416; G06F 1/18; G06F 1/16; G06F 3/038; G09G 3/20
See application file for complete search history.

(56) References Cited

FOREIGN PATENT DOCUMENTS

| | | | |
|---|---|---|---|
| KR | 10-2016-0025443 | A | 3/2016 |
| KR | 10-2018-0125671 | A | 11/2018 |
| KR | 10-2020-0052261 | A | 5/2020 |
| KR | 1020210019863 | A | 2/2021 |

* cited by examiner

Vemf

Vemf

0V
-Vemf
~0V
Position A

Vemf
0V

Vemf
0V
Position A

TOUCH INPUT DEVICE

CROSS-REFERENCE TO RELATED APPLICATIONS

This U.S. Non-Provisional Patent Application is a U.S. National Stage Application under 35 U.S.C. § 371 of Patent Cooperation Treaty (PCT) Application No. PCT/KR2022/018274, filed Nov. 18, 2022, which claims priority to Korean Patent Application No. 10-2021-0170886, filed on Dec. 2, 2021, the entire disclosures of all of which are hereby incorporated by reference herein, for all purposes.

TECHNICAL FIELD

The present disclosure relates to a multifunctional touch input device capable of detecting a touch position, driving a stylus pen, and detecting a position of the stylus pen.

BACKGROUND ART

Various kinds of input devices are used to operate a computing system. For example, the input devices such as a button, a key, a joystick, and a touch screen are being used. Since the touch screen is easily and simply operated, a touch input device including the touch screen is increasingly used when operating the computing system. Also, in recent years, a stylus pen may be additionally used when operating the touch input device.

FIG. 1 is a schematic view for explaining that the output voltage (Vout) of CVA (Capacitor Voltage Amplitude) varies according to a position of the stylus pen 10 on a typical touch screen.

Referring to FIG. 1, a reason why an output of the CVA is different depending on the position of the stylus pen 10 on the touch screen is that impedance ratios of both sides with respect to the stylus pen 10 on a sensing line are different.

Based on a major axis of the typical touch screen, a resistance R of a metal mesh touch sensor is approximately 1.2 k ohm, and the capacitor C is approximately 250 pF.

Based on ten distributed models, at a driving frequency of 300 kHz, an impedance of the capacitor is approximately 200 times (120 ohm vs. $1/(2\pi*300\ k*25\ pF)=21$ k ohm) greater than a resistance thereof. Therefore, the capacitor is a main factor.

FIG. 2 is a view for explaining that output voltages Vout1 and Vout2 of the CVA are different according to the position of the stylus pen 10 in FIG. 1 through current sensing, and FIG. 3 is a view for explaining that the output voltages Vout1 and Vout2 of the CVA are different according to the position of the stylus pen 10 in FIG. 1 through voltage sensing.

Referring to FIGS. 2 and 3, the output voltage of the CVA is different according to the position of the stylus pen 10 on the sensing line. That is, the output voltage of the CVA increases as the stylus pen 10 moves toward the sensing circuit unit 50 and decreases as the stylus pen 10 moves away from the sensing circuit unit 50

DISCLOSURE OF THE INVENTION

Technical Problem

The present disclosure provides a multifunctional touch input device capable of detecting a touch position, driving a stylus pen, and detecting a position of the stylus pen.

The present disclosure also provides a touch input device capable of widening a bandwidth of an operation frequency of each of a touch driving signal and a pen driving signal when a screen of the touch input device increases to a size of a screen of a tablet personal computer.

The present disclosure also provides a touch input device capable of relieving attenuation of a pen sensing signal when a screen of the touch input device increases to a size of a screen of a tablet personal computer.

Technical Solution

Embodiments of the present invention provide a touch input device including a sensor unit and a control unit, and the sensor unit includes: a plurality of first patterns each extending in a first direction and having one ends electrically connected to the control unit; a plurality of second patterns each extending in the first direction and disposed adjacent to the first patterns; a plurality of third patterns each extending in a second direction perpendicular to the first direction and having one ends electrically connected to the control unit; and a plurality of fourth patterns each extending in the second direction, disposed adjacent to the third patterns, and having one ends that are electrically floated and other ends that are electrically connected to each other. Here, the first patterns include first-a patterns and first-b patterns arranged in the first direction, and the second patterns include second-a patterns and second-b patterns arranged in the first direction.

Here, a plurality of second-a patterns of the plurality of second patterns may have the other ends that are electrically connected to each other and one ends of which two ends that are adjacent to each other in the second direction are electrically connected to each other and electrically connected to the control unit, and a plurality of second-b patterns of the plurality of second patterns may have the other ends that are electrically connected to each other and one ends of which two ends that are adjacent to each other in the second direction are electrically connected to each other and electrically connected to the control unit.

Here, the control unit may control the sensor unit to operate in one of a touch driving/sensing mode for sensing a touch position of an object, an antenna driving mode for driving a stylus pen, and a stylus sensing mode for sensing a touch position of the stylus pen. Here, in the touch driving/sensing mode, the control unit may apply a touch driving signal to the plurality of first patterns and receives a touch sensing signal through the plurality of third patterns, in the antenna driving mode, the control unit may apply a pen driving signal for driving the stylus pen to the plurality of second patterns, and in the stylus sensing mode, the control unit may receive a pen sensing signal from the stylus pen through the plurality of first patterns and the plurality of third patterns.

In other embodiments of the present invention, a touch input device includes a sensor unit and a control unit, and the sensor unit includes: a plurality of first patterns each extending in a first direction and having one ends electrically connected to the control unit; a plurality of second patterns each extending in the first direction, disposed adjacent to the first patterns, and having one ends that are electrically connected to the control unit and other ends that are electrically connected to each other; a plurality of third patterns each extending in a second direction perpendicular to the first direction and having one ends electrically connected to the control unit; and a plurality of fourth patterns each extending in the second direction, disposed adjacent to the third patterns, and having one ends that are electrically floated and other ends that are electrically connected to each other.

Here, the control unit may control the sensor unit to operate in one of a touch driving/sensing mode for sensing a touch position of an object, an antenna driving mode for driving a stylus pen, and a stylus sensing mode for sensing a touch position of the stylus pen. Here, in the touch driving/sensing mode, the control unit may apply a touch driving signal to the plurality of first patterns and receives a touch sensing signal through the plurality of third patterns, in the antenna driving mode, the control unit may apply a pen driving signal for driving the stylus pen to the plurality of second patterns, and in the stylus sensing mode, the control unit may receive a pen sensing signal from the stylus pen through the plurality of second patterns and the plurality of third patterns.

In still other embodiments of the present invention, a touch input device includes a sensor unit and a control unit, and the sensor unit includes: a plurality of first patterns each extending in a first direction and having one ends electrically connected to the control unit; a plurality of second patterns each extending in the first direction, disposed adjacent to the first patterns, and having one ends that are electrically floated and other ends that are electrically connected to each other; a plurality of third patterns each extending in a second direction perpendicular to the first direction and having one ends electrically connected to the control unit; and a plurality of fourth patterns each extending in the second direction, disposed adjacent to the third patterns, and having one ends that are electrically connected to the control unit and other ends that are electrically connected to each other.

Here, the control unit may control the sensor unit to operate in one of a touch driving/sensing mode for sensing a touch position of an object, an antenna driving mode for driving a stylus pen, and a stylus sensing mode for sensing a touch position of the stylus pen. Here, in the touch driving/sensing mode, the control unit may apply a touch driving signal to the plurality of first patterns and receives a touch sensing signal through the plurality of third patterns, in the antenna driving mode, the control unit may apply a pen driving signal for driving the stylus pen to the plurality of fourth patterns, and in the stylus sensing mode, the control unit may receive a pen sensing signal from the stylus pen through the plurality of first patterns and the plurality of fourth patterns.

Advantageous Effects

When the touch input device according to the embodiment of the present invention is used, the touch position may be detected, and the position of the stylus pen may be detected while detecting the touch position and driving the stylus pen.

Also, when the screen of the touch input device increases to the size of the screen of the tablet personal computer, the bandwidth of the operation frequency of each of the touch driving signal and the pen driving signal may be widened.

Also, when the screen of the touch input device increases to the size of the screen of the tablet personal computer, the attenuation of the pen sensing signal may be relieved.

MODE FOR CARRYING OUT THE INVENTION

Figure 1:
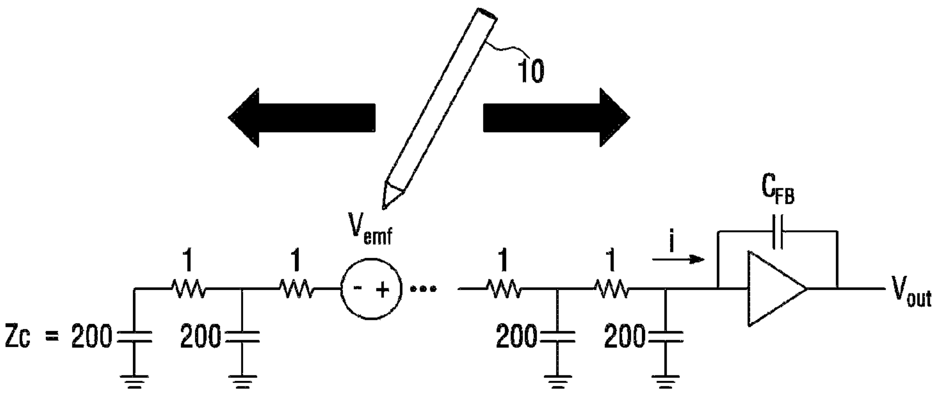
FIG. 1 is a schematic view for explaining that an output voltage Vout of a capacitor voltage amplitude (CVA) is varied according to a position of the stylus pen 10 on a flexible display panel of a typical touch input device.
Figure 2:
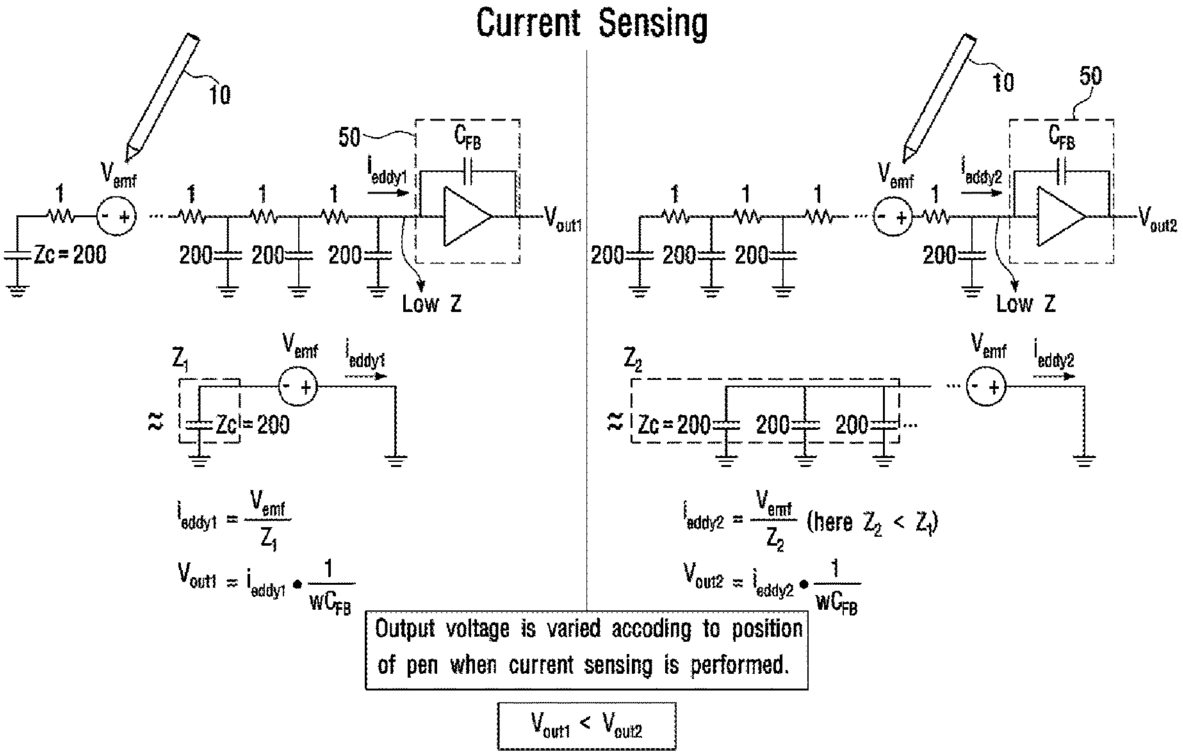
FIG. 2 is a view for explaining that output voltages Vout1 and Vout2 of the CVA are varied according to the position of the stylus pen 10 in FIG. 1 through current sensing.
Figure 3:
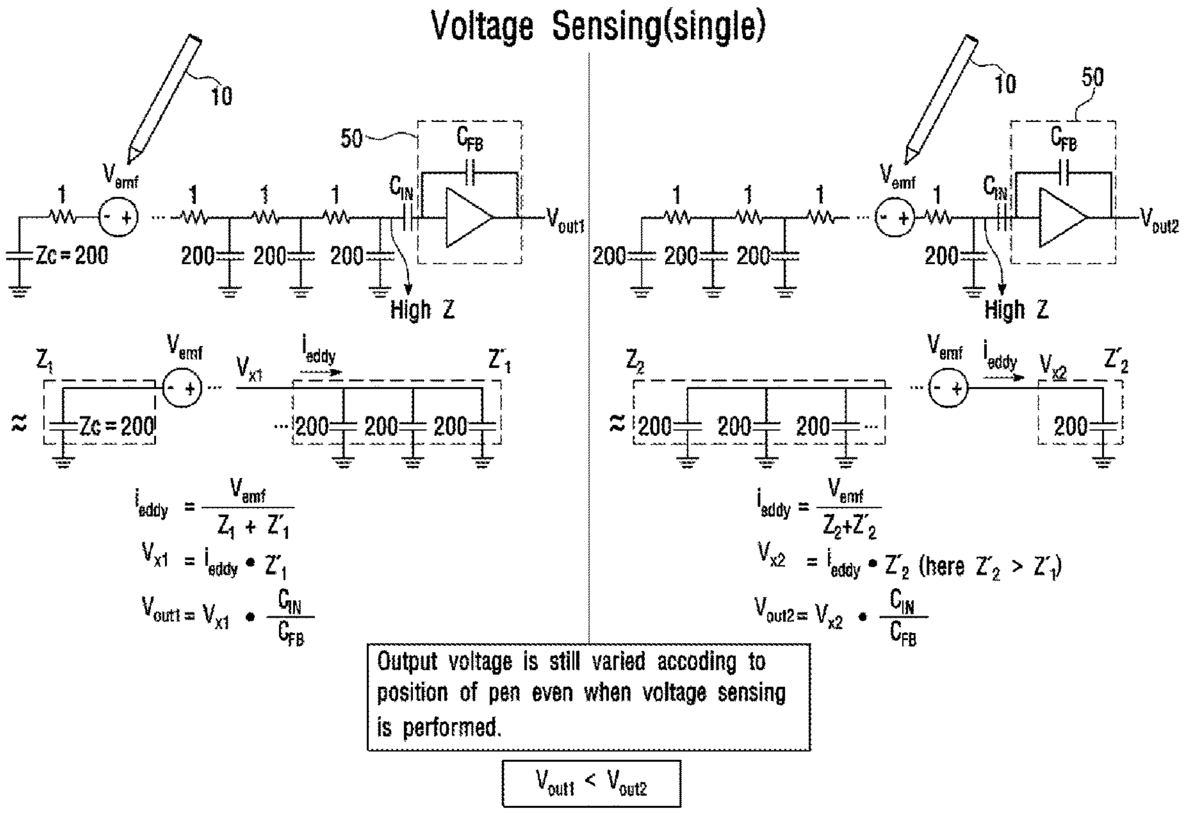
FIG. 3 is a view for explaining that the output voltages Vout1 and Vout2 of the CVA are varied according to the position of the stylus pen 10 in FIG. 1 through voltage sensing.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

A touch input device according to various embodiments of the present document, as an electronic device, may be a touch input device such as a typical smartphone or a touch input device having a rectangular screen that is relatively greater than a screen of the typical smartphone and having a diagonal length of about 10 inches or more to about 13 inches or less. For example, the touch input device may include at least one of a foldable smartphone, a tablet personal computer, a vehicle display device, an e-book reader, a laptop personal computer, and a netbook computer.

Also, the touch input device according to various embodiments of the present invention may detect a position of an object such as a finger disposed on a screen, output a driving signal for driving a stylus pen, and detect a position of the stylus pen disposed on the screen by sensing a signal output from the stylus pen.

Hereinafter, various embodiments of the present invention will be described in detail with reference to the accompanying drawings.

Figure 4:
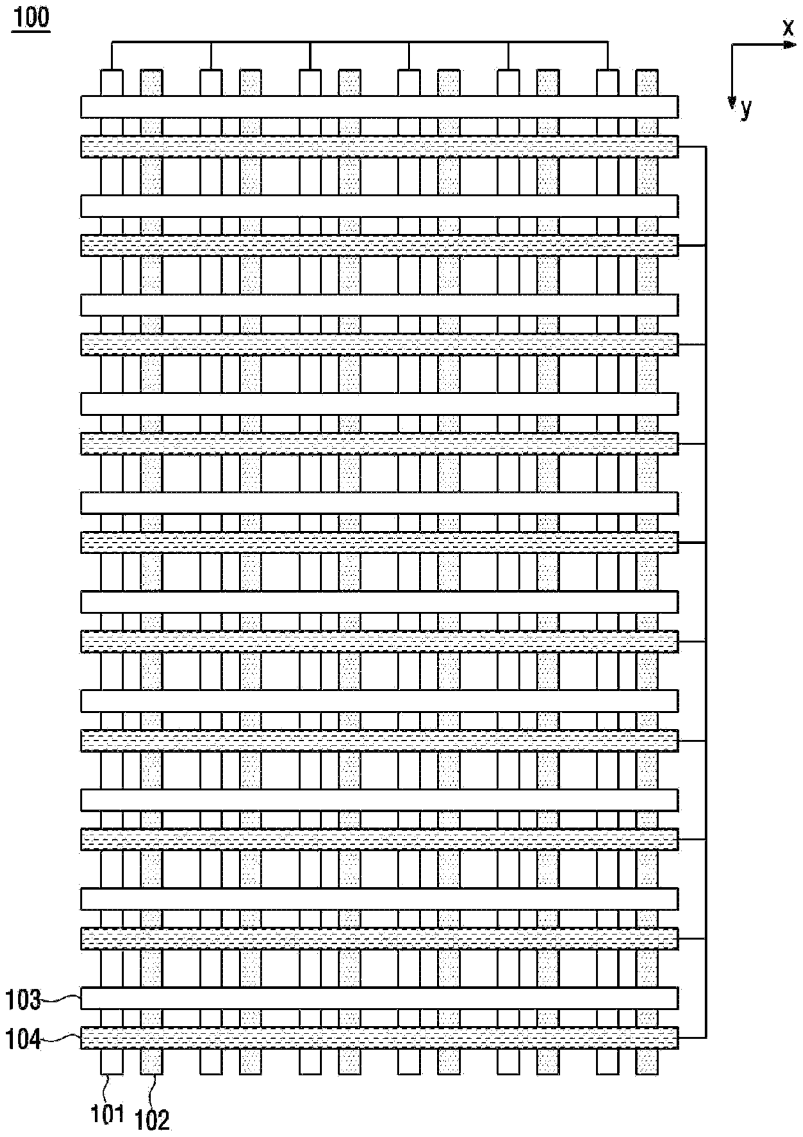
FIG. 4 is a schematic configuration view illustrating a sensor unit 100 of a touch input device according to a first embodiment of the present invention.

FIG. 4 is a schematic configuration view illustrating a sensor unit 100 of the touch input device according to a first embodiment of the present invention.

The touch input device according to the first embodiment of the present invention may be a portrait-type touch input device. In this portrait type touch input device, a width is smaller than a height, and a control unit (not shown) for controlling the sensor unit 100 is disposed below the sensor unit 100. For example, the touch input device corresponds to a shape of a smartphone.

The sensor unit 100 may detect a position of an object such as a finger positioned on the screen, drive the stylus pen disposed on the screen, and detect a position of the stylus pen on the screen by sensing a signal emitted from the stylus pen.

The sensor unit 100 includes a plurality of patterns (or a plurality of electrodes).

The sensor unit 100 may include a plurality of first to fourth patterns 101, 102, 103, and 104.

A first pattern 101 has a shape extending in an arbitrary first direction y. The first direction may be a major axis direction of the screen of the touch input device. The first pattern 101 may also be referred to as Active TX (ATX).

A second pattern 102 has a shape extending in the first direction y, is disposed adjacent to the first pattern 101, and is spaced a predetermined distance from the first pattern 101. The second pattern 102 may also be referred to as Dummy TX (DTX).

The third pattern 103 has a shape extending in a second direction x different from the first direction. The second direction x may be a direction perpendicular to the first direction y, and may be a minor axis direction of the screen of the touch input device. The third pattern 103 may also be referred to as Active RX (ARX).

A fourth pattern 104 has a shape extending in the second direction x, is disposed adjacent to the third pattern 103, and is spaced a predetermined distance from the third pattern 103. The fourth pattern 104 may also be referred to as Dummy RX (DRX).

The third and fourth patterns 103 and 104 are disposed on the first and second patterns 101 and 102 and are spaced a predetermined distance from the first and second patterns 101 and 102. The sensor unit in which the first to fourth patterns are disposed on the same layer will be described in detail with reference to FIG. 15.

A plurality of first patterns 101 are arranged in the second direction x, and a plurality of second patterns 102 are also arranged in the second direction x. A plurality of third patterns 103 are arranged in the first direction y, and a plurality of fourth patterns 104 are also arranged in the first direction y.

Since the first pattern 101 extends in the first direction y, the third pattern 103 extends in the second direction x, and the first direction y is longer than the second direction x, the number of the first plurality of patterns 101 is less than the number of the third plurality of patterns 103. Thus, the number of channels of the plurality of first patterns 101 is less than that of channels of the plurality of third patterns 103.

Here, the number of the plurality of first patterns 101 and the number of the plurality of third patterns 103 may increase or decrease according to a size of the screen of the touch input device.

The number of the plurality of second patterns 102 may be equal to that of the plurality of first patterns 101. The other ends of the plurality of second patterns 102 are electrically connected to each other through a conductive pattern. Here, the conductive pattern may be a metal mesh or a silver trace.

Figure 5:
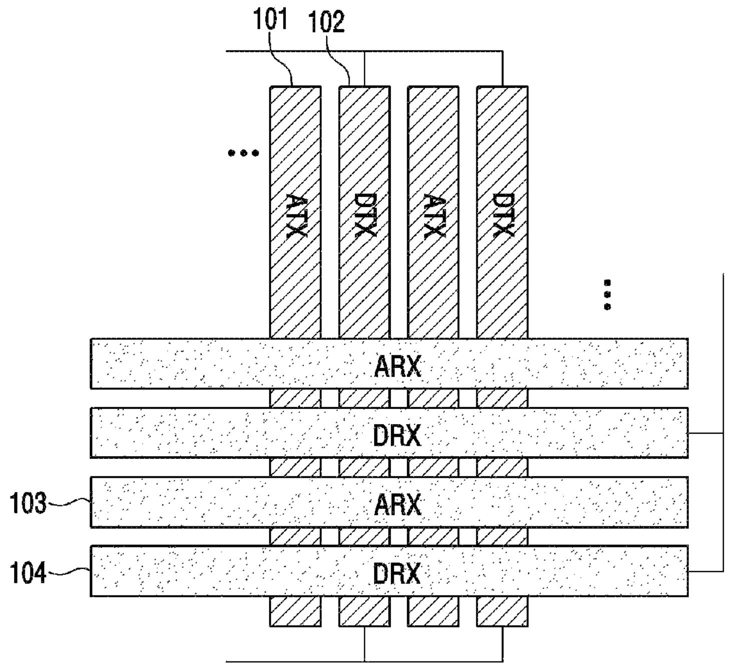
FIG. 5 is a schematic configuration view illustrating an example of the sensor unit 100 in FIG. 4.

Here, as illustrated in FIG. 5, one ends of two or more second patterns 102 among the plurality of second patterns 102 may be electrically connected to each other through a conductive pattern. Due to this configuration, the number of channels of the plurality of second patterns 102 may be reduced to a half of the number of the channels of the plurality of first patterns 101.

Figure 6:
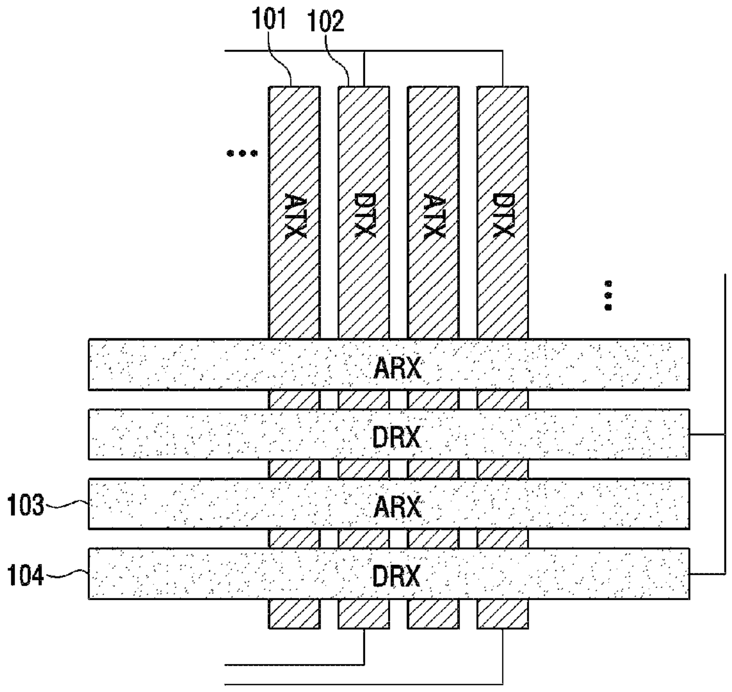
FIG. 6 is a schematic configuration view illustrating another example of the sensor unit 100 in FIG. 4.

As illustrated in FIG. 6, each of the one ends of the plurality of second patterns 102 may be individually connected to one conductive pattern.

Referring to FIG. 4 again, since the plurality of third patterns 103 are arranged in the first direction y, the number of the plurality of third patterns 103 is greater than that of the plurality of first patterns 101. Thus, the number of the channels of the plurality of third patterns 103 is greater than that of the channels of the plurality of first patterns 101.

The number of the plurality of fourth patterns 104 may be equal to that of the plurality of third patterns 103. The other ends of the plurality of fourth patterns 104 are electrically connected to each other through a conductive pattern.

In the sensor unit 100 of the touch input device in FIG. 4, the plurality of first patterns 101 and the plurality of third patterns 103 basically sense a touch of an object such as a finger. To this end, the plurality of first patterns 101 operate as touch driving electrodes to which a touch driving signal is applied, and the plurality of third patterns 103 operate as touch sensing electrodes (or touch receiving electrodes) to which a touch sensing signal is received, and vice versa.

Various combinations of the plurality of first to fourth patterns 101, 102, 103, and 104 may be used so that the sensor unit 100 of the touch input device shown in FIG. 4 drives and senses the stylus pen. The various combinations are shown in <Table 1> below. In <Table 1> below, '1' refers to the plurality of first patterns 101, '2' refers to the plurality of second patterns 102, '3' refers to the plurality of third patterns 103, and '4' refers to the plurality of fourth patterns 104.

TABLE 1

| | Finger Touch Operation | | Stylus Operation | | | | Uplink signal magnitude | | Downlink signal magnitude | | Stylus additional channel | |
|---|---|---|---|---|---|---|---|---|---|---|---|---|
| | | | Driving | | Sensing | | | | | | | |
| No. | Driving Tx | Sensing Rx | Major axis | Minor axis | X-axis | Y-axis | Major axis | Minor axis | X-axis | Y-axis | Driving | Sensing |
| 1 | 1 | 3 | 2 | | 1 | 3 | Large | | Small | Small | Yes | No |
| 2 | 1 | 3 | 2 | | 1 | 4 | Large | | Small | Large | Yes | Yes |
| 3 | 1 | 3 | 2 | | 2 | 3 | Large | | Large | Small | Yes | Yes |
| 4 | 1 | 3 | 2 | | 2 | 4 | Large | | Large | Large | Yes | Yes |
| 5 | 1 | 3 | | 4 | 1 | 3 | | Large | Small | Small | Yes | No |
| 6 | 1 | 3 | | 4 | 1 | 4 | | Large | Small | Large | Yes | Yes |
| 7 | 1 | 3 | | 4 | 2 | 3 | | Large | Large | Small | Yes | Yes |
| 8 | 1 | 3 | | 4 | 2 | 4 | | Large | Large | Large | Yes | Yes |
| 9 | 1 | 3 | 2 | 4 | 1 | 3 | Large | Large | Small | Small | Yes | No |
| 10 | 1 | 3 | 2 | 4 | 1 | 4 | Large | Large | Small | Large | Yes | Yes |
| 11 | 1 | 3 | 2 | 4 | 2 | 3 | Large | Large | Large | Small | Yes | Yes |
| 12 | 1 | 3 | 2 | 4 | 2 | 4 | Large | Large | Large | Large | Yes | Yes |
| 13 | 1 | 3 | 1 | | 1 | 3 | Small | | Small | Small | No | No |
| 14 | 1 | 3 | 1 | | 1 | 4 | Small | | Small | Large | No | Yes |
| 15 | 1 | 3 | 1 | | 2 | 3 | Small | | Large | Small | No | Yes |
| 16 | 1 | 3 | 1 | | 2 | 4 | Small | | Large | Large | No | Yes |
| 17 | 1 | 3 | | 3 | 1 | 3 | | Small | Small | Small | No | No |
| 18 | 1 | 3 | | 3 | 1 | 4 | | Small | Small | Large | No | Yes |
| 19 | 1 | 3 | | 3 | 2 | 3 | | Small | Large | Small | No | Yes |
| 20 | 1 | 3 | | 3 | 2 | 4 | | Small | Large | Large | No | Yes |
| 21 | 1 | 3 | 1 | 3 | 1 | 3 | Small | Small | Small | Small | No | No |
| 22 | 1 | 3 | 1 | 3 | 1 | 4 | Small | Small | Small | Large | No | Yes |
| 23 | 1 | 3 | 1 | 3 | 2 | 3 | Small | Small | Large | Small | No | Yes |
| 24 | 1 | 3 | 1 | 3 | 2 | 4 | Small | Small | Large | Large | No | Yes |
| 25 | 1 | 3 | 2 | 3 | 1 | 3 | Large | Small | Small | Small | Yes | No |
| 26 | 1 | 3 | 2 | 3 | 1 | 4 | Large | Small | Small | Large | Yes | Yes |
| 27 | 1 | 3 | 2 | 3 | 2 | 3 | Large | Small | Large | Small | Yes | Yes |
| 28 | 1 | 3 | 2 | 3 | 2 | 4 | Large | Small | Large | Large | Yes | Yes |
| 29 | 1 | 3 | 1 | 4 | 1 | 3 | Small | Large | Small | Small | Yes | No |
| 30 | 1 | 3 | 1 | 4 | 1 | 4 | Small | Large | Small | Large | Yes | Yes |
| 31 | 1 | 3 | 1 | 4 | 2 | 3 | Small | Large | Large | Small | Yes | Yes |
| 32 | 1 | 3 | 1 | 4 | 2 | 4 | Small | Large | Large | Large | Yes | Yes |

Referring to the <Table 1> above, in various combinations No. 1 to No. 32, the plurality of first patterns 101 and the plurality of third patterns 103 are used for sensing a touch of an object such as a finger. Specifically, the plurality of first patterns 101 operate as touch driving electrodes, and the plurality of third patterns 103 operate as touch receiving electrodes.

At least one or two of the plurality of first to fourth patterns 101, 102, 103, and 104 may operate as a stylus driving electrode for driving the stylus pen. At least one or two of the plurality of first to fourth patterns 101, 102, 103, and 104 may be used to form a current loop for driving the stylus pen. For example, an X-axis driving may be performed by one of the plurality of first patterns 101 and the plurality of second patterns 102, and a Y-axis driving may be performed by one of the plurality of third patterns 103 and the plurality of fourth patterns 104. The driving of the stylus pen may be performed by either the X-axis driving or the Y-axis driving or by both the X-axis driving and the Y-axis driving.

At least one or two of the plurality of first to fourth patterns 101, 102, 103, and 104 may operate as a sensing electrode for sensing a stylus pen signal emitted from the stylus pen. Since both X-axis sensing and Y-axis sensing are required to sense the stylus pen signal, two patterns of the plurality of first to fourth patterns 101, 102, 103, and 104 are used. The X-axis sensing may be performed by one of the plurality of first patterns 101 and the plurality of second patterns 102, and the Y-axis sensing may be performed by one of the plurality of third patterns 103 and the plurality of fourth patterns 104.

In the <Table 1> above, the 'uplink signal magnitude' represents a magnitude of a driving signal for driving the stylus pen. When the same stylus pen driving signal is applied to each of the plurality of first patterns 101 and the plurality of second patterns 102, and magnitudes of signals received by the stylus pen are compared, the uplink signal is relatively greater when the stylus pen driving signal is applied to the plurality of second patterns 102 than when the stylus pen driving signal is applied to the plurality of first patterns 101.

This is because the other ends of the plurality of first patterns 101 are not electrically connected not to form a current loop while the other ends of the plurality of second patterns 102 are electrically connected to form at least one current loop when two or more second patterns to which the stylus pen driving signal is applied are properly selected. When current flows through each first pattern 101, since RC of each first pattern 101 is charged, the current may not flow smoothly from one end (or the first end) to the other end (or the second end) of each first pattern 101. Also, a stylus pen driving signal applied through the plurality of first patterns 101 is transmitted to the plurality of second patterns 101 in which the current loop is formed through the capacitive coupling. Here, signal attenuation occurs by the capacitive coupling.

Likewise, the uplink signal is relatively greater when the stylus pen driving signal is applied to the plurality of fourth patterns 104 than when the stylus pen driving signal is applied to the plurality of third patterns 103.

In the <Table 1> above, the 'downlink signal magnitude' represents a magnitude of stylus pen signal received from the stylus pen 10 of FIG. 1A. When the same stylus pen driving signal is received by each of the plurality of first patterns 101 and the plurality of second patterns 102, and magnitudes of the signals are compared, the downlink signal is relatively greater when the stylus pen driving signal is received by the plurality of second patterns 102 than when the stylus pen driving signal is received by the plurality of first patterns 101. This is because, although the other ends (the second end) of the plurality of second patterns 102 are electrically connected to form a current loop, the other ends (the first end) of the plurality of first patterns 101 are not electrically connected to each other, particularly, the stylus pen signal is transmitted to the plurality of first patterns 101 from the plurality of second patterns 101 in which the current loop is formed through the capacitive coupling, and thus attenuation of the downlink signal occurs.

Likewise, the downlink signal is relatively greater when the stylus pen signal is received through the plurality of fourth patterns 104 than when the stylus pen signal is received through the plurality of third patterns 103.

In the <Table 1> above, the 'stylus additional channel' represents whether an additional channel is necessary for the stylus pen in addition to the touch sensing. When the plurality of second patterns 102 and/or the plurality of fourth patterns 104 are used for driving or sensing the stylus pen, an additional channel is required (marked by 'Yes' in the <Table 1>). Also, when the plurality of first patterns 101 and/or the plurality of third patterns 103 for touch sensing are used for driving or sensing the stylus pen, an additional channel is not required (marked by 'No' in the <Table 1>).

Hereinafter, some examples of the various combinations No. 1 to 32 of the <Table 1> above will be described in detail below. Here, combinations not described will be sufficiently understood by a person skilled in the art through the following detailed description.

In case of No. 1, the plurality of first patterns 101 are used as a touch driving electrode for sensing a touch of an object and a stylus sensing electrode for sensing a stylus pen signal. The plurality of second patterns 102 are used as a stylus driving electrode for driving the stylus pen. The plurality of third patterns 103 are used as the stylus sensing electrode for sensing the stylus pen signal as well as the touch sensing electrode for sensing the touch of the object. Also, the plurality of fourth patterns 104 are electrically floated.

In case of No. 1, since the plurality of second patterns 102 are used as the stylus driving electrode, the uplink signal has a relatively large magnitude. Since the plurality of first patterns 101 and the plurality of third patterns 103 are used as the stylus sensing electrode, the downlink signal has a relatively small magnitude. Also, since the plurality of second patterns 102 are separately used as the stylus driving electrode, an additional channel for driving the stylus pen is required, but an additional channel for sensing the stylus pen is not required.

In case of No. 4, the plurality of first patterns 101 are used as the touch driving electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch sensing electrode for sensing the touch of the object. The plurality of fourth patterns 104 are used as the stylus sensing electrode for sensing the stylus pen signal.

In case of No. 4, since the plurality of second patterns 102 are used as the stylus driving electrode, the uplink signal has a relatively large magnitude. The plurality of second patterns 102 and the plurality of fourth patterns 104 are used as the stylus sensing electrode, the downlink signal has a relatively large magnitude. Also, since the plurality of second patterns 102 are separately used as the stylus sensing electrode and the stylus sensing electrode, and the plurality of fourth patterns 104 are separately used as the stylus sensing electrode, a separate additional channel is required for driving and sensing the stylus pen.

In case of No. 8, the plurality of first patterns 101 are used as the touch driving electrode for sensing the touch of the object. The plurality of second patterns 102 are used as the stylus sensing electrode for sensing the stylus pen signal. The plurality of third patterns 103 are used as the touch sensing electrode for sensing the touch of the object. Also, the plurality of fourth patterns 104 are used as the stylus sensing electrode for sensing the stylus pen signal as well as the stylus driving electrode for driving the stylus pen.

In the case of No. 8, since the plurality of fourth patterns 104 are used as the stylus driving electrode, the uplink signal has a relatively large magnitude. The plurality of second patterns 102 and the plurality of fourth patterns 104 are used as the stylus sensing electrode, the downlink signal has a relatively large magnitude. Also, since the plurality of second patterns 102 are separately used as the stylus sensing electrode, and the plurality of fourth patterns 104 are separately used as the stylus driving electrode and the stylus sensing electrode, a separate additional channel is required for driving and sensing the stylus pen.

In case of No. 12, the plurality of first patterns 101 are used as the touch driving electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch sensing electrode for sensing the touch of the object. Also, the plurality of fourth patterns 104 are used as the stylus sensing electrode for sensing the stylus pen signal as well as the stylus driving electrode for driving the stylus pen.

In case of No. 12, since the plurality of second and fourth patterns 102 and 104 are used as the stylus driving electrode, the uplink signal has a relatively large magnitude. The plurality of second patterns 102 and the plurality of fourth patterns 104 are used as the stylus sensing electrode, the downlink signal has a relatively large magnitude. Also, since the plurality of second patterns 102 are separately used as the stylus driving electrode and the stylus sensing electrode, and the plurality of fourth patterns 104 are separately used as the stylus driving electrode and the stylus sensing electrode, a separate additional channel is required for driving and sensing the stylus pen.

In case of No. 13, the plurality of first patterns 101 are used as the touch driving electrode for sensing the touch of an object, the stylus driving electrode for driving the stylus pen, and the stylus sensing electrode for sensing the stylus pen signal. The plurality of third patterns 103 are used as the stylus sensing electrode for sensing the stylus pen signal as well as the touch sensing electrode for sensing the touch of the object. Also, the plurality of second and fourth patterns 102 and 104 are electrically floated.

In case of No. 13, since the plurality of first patterns 101 are used as the stylus driving electrode, the uplink signal has a relatively large magnitude. Since the plurality of first patterns 101 and the plurality of third patterns 103 are used as the stylus sensing electrode, the downlink signal has a relatively small magnitude. Also, since the plurality of first patterns 101 are used as the stylus driving electrode and the stylus sensing electrode, and the plurality of fourth patterns 103 are used as the stylus sensing electrode, a separate additional channel is not required for driving and sensing the stylus pen.

In case of No. 17, the plurality of first patterns 101 are used as the touch driving electrode for sensing the touch of the object and a stylus sensing electrode for sensing the stylus pen signal. The plurality of third patterns 103 are used as the touch sensing electrode for sensing the touch of the object, the stylus driving electrode for driving the stylus pen, and the stylus sensing electrode for sensing the stylus pen signal. Also, the plurality of second and fourth patterns 102 and 104 are electrically floated.

In the case of No. 17, since the plurality of fourth patterns 104 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of second patterns 102 are separately used as the stylus sensing electrode, and the plurality of fourth patterns 103 are used as the stylus driving electrode and the stylus sensing electrode, a separate additional channel is not required for driving and sensing the stylus pen.

In case of No. 21, the plurality of first patterns 101 are used as the touch driving electrode for sensing the touch of an object, the stylus driving electrode for driving the stylus pen, and the stylus sensing electrode for sensing the stylus pen signal. The plurality of third patterns 103 are used as the touch sensing electrode for sensing the touch of the object, the stylus driving electrode for driving the stylus pen, and the stylus sensing electrode for sensing the stylus pen signal. Also, the plurality of second and fourth patterns 102 and 104 are electrically floated.

In case of No. 21, since the plurality of first and third patterns 101 and 103 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of second patterns 102 are used as the stylus driving electrode and the stylus sensing electrode, and the plurality of third patterns 103 are used as the stylus driving electrode and the stylus sensing electrode, a separate additional channel is not required for driving and sensing the stylus pen.

Among the various combinations No. 1 to No. 32 in the <Table 1> above, in Nos. 1, 5, 9, 25, and 29, driving is 'Yes' and sensing is 'No' in a column of 'Stylus additional channel'. The Nos. 1, 5, 9, 25, and 29 use the plurality of first and third patterns 101 and 103 for sensing the stylus pen and the plurality of second and/or fourth patterns 102 and 104 for driving the stylus pen. When the stylus pen is driven, since formation of a magnetic field for resonating the stylus pen may be somewhat difficult although the plurality of second and/or fourth patterns 102 and 104 are used, as illustrated in FIG. 5 two or more adjacent one ends (the first end) of the second patterns may be electrically connected to each other. Likewise, two or more adjacent one ends (the first end) of the fourth patterns may be electrically connected to each other. This configuration has an advantage of reducing the additional channel for driving the stylus pen.

Figure 7:
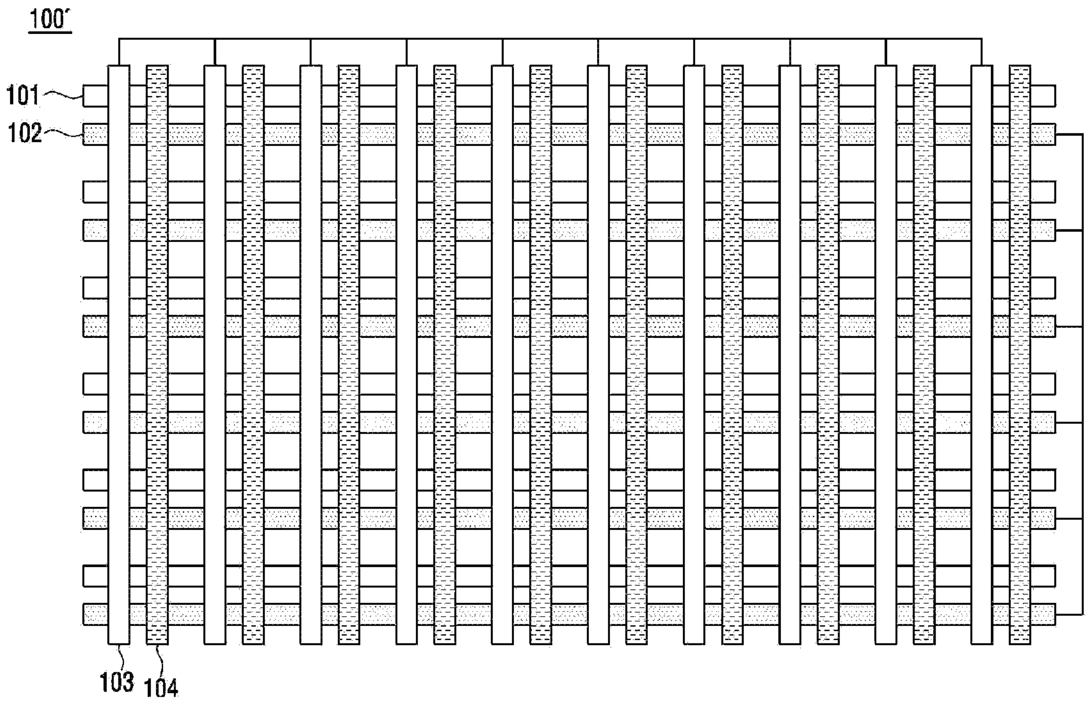
FIG. 7 is a schematic configuration view illustrating a sensor unit 100' of a touch input device according to a second embodiment of the present invention.

FIG. 7 is a schematic configuration view illustrating a sensor unit 100' according to a second embodiment of the present invention;

The touch input device according to the second embodiment of the present invention may be a landscape-type touch input device. In this landscape-type touch input device, a width is greater than a height, and a control unit (not shown) for controlling the sensor unit 100' may be disposed below the sensor unit 100'. For example, the touch input device may correspond to a shape of a tablet PC.

The sensor unit 100' of the touch input device according to the second embodiment of the present invention has the same configuration as that of the sensor unit 100 of the touch input device according to the first embodiment in FIG. 4, and the sensor unit 100' only rotates at 90° from the sensor unit 100.

The sensor unit 100' of the touch input device according to the second embodiment of the present invention includes a plurality of first to fourth patterns 101, 102, 103, and 104. The first pattern 101 and the second pattern 102 are adjacent to each other and each have a shape extending in one direction. The third pattern 103 and the fourth pattern 104 are adjacent to each other and each have a shape extending in a different direction from the one direction. The other ends of the plurality of second patterns 102 are electrically connected to each other, and the other ends of the plurality of fourth patterns 104 are also electrically connected to each other.

When the sensor unit 100' of the touch input device according to the second embodiment in FIG. 7 has a size of about 10 to 14 inches, which is the size of a landscape-type tablet PC, and is implemented as with an example of No. 1 in the <Table 1> above, the number of total channels and the number of driving trace channels (TX Trace Channels) of the sensor unit 100' are summarized in <Table 2> below.

TABLE 2

| | Number of channels (about 10 inches or more) |
|---|---|
| Finger TX (101) | 42 |
| Finger RX (103) | 56 |
| Stylus TX (102) | 21 |
| Top channel (101 + 102 + 103) | 119 |
| TX Trace channel (101 + 102) | 63 |

Figure 8:
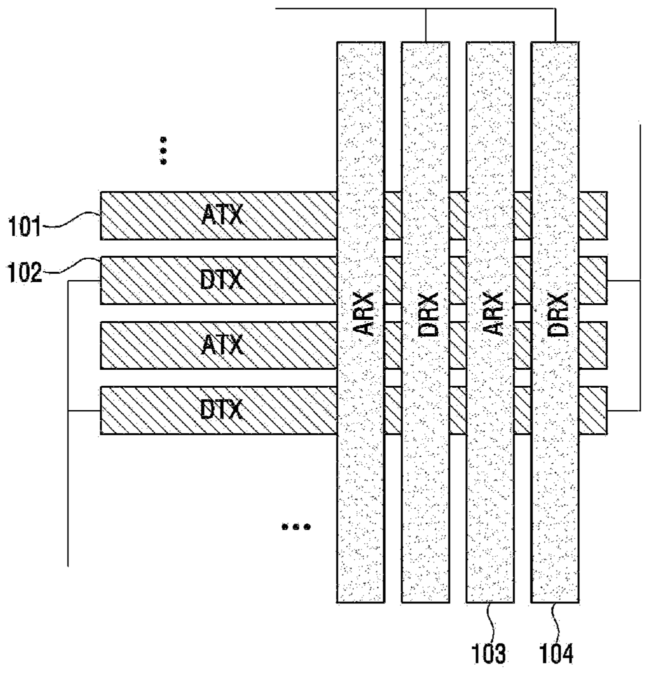
FIG. 8 is a schematic configuration view illustrating an example of the sensor unit 100' in FIG. 7.

In the <Table 2> above, the number of channels of Stylus TX is a value obtained by dividing the number of the plurality of first patterns 101 by 2. This is because the number of channels are reduced by half as two adjacent one ends of one ends (first ends) of the plurality of second patterns 102 are electrically connected while the number of the plurality of second patterns 102 is equal to that of the plurality of first patterns 101 as illustrated in FIG. 8.

In the <Table 2> above, the number of TX Trace channels is a sum of the number of channels of Finger TX and the number of channels of Stylus TX. The number of the TX Trace channels is a key factor in determining a thickness of a bezel in a width direction of the touch input device according to the second embodiment. This is because the control unit (not shown) is disposed below (or above) the sensor unit 100' in the touch input device according to the second embodiment. As the number of the TX Trace channels is reduced, the thickness of the bezel in the width direction of the touch input device may be reduced.

While there is no problem when the screen of the touch input device shown in FIG. 7 has a size of a screen of a smartphone, e.g., 6.9 inches, when the size of the screen of the touch input device shown in FIG. 7 increases to 11 inches or 12.9 inches that is a size of a screen of a tablet PC, lengths of the first to fourth patterns 101, 102, 103, and 104 of the sensor unit 100' also increase, so that a resistance value and a capacitance value of the sensor unit increase. Since the increase of the resistance and capacitance values allows an operating frequency bandwidth of each of the touch driving signal applied to one pattern used as the touch driving electrode among the first to third patterns and the stylus driving signal for driving the stylus pen to decrease, an operating frequency bandwidth required for a design may not be obtained. The resistance and capacitance values may be reduced to solve the above-described limitation. However, the feature of reducing the resistance and capacitance values is limited, and the above-described limitation is not still solved although the values are maximally reduced.

Also, the stylus pen signal received from the stylus pen and inputted to the control unit of the touch input device is attenuated as much as the sensor unit 100' increases. Particularly, as the stylus pen sensing signal is attenuated in a process of being transmitted to the control unit from a portion spaced farthest from the control unit in the first to fourth patterns 101, 102, 103, and 104 of the sensor unit 100', a voltage value required for a design is not outputted.

The above-described limitations may be solved by using the plurality of second patterns 102 as the stylus pen sensing electrode for sensing the stylus pen signal as with examples of Nos. 3, 4, 7, 8, 11, 12, 15, 16, 19, 20, 23, 24, 27, 28, 31, and 32 of the <Table 1> or by using the plurality of fourth patterns 104 as the stylus pen sensing electrode for sensing the stylus pen signal as with examples of Nos. 2, 4, 6, 8, 10, 12, 14, 16, 18, 20, 22, 24, 26, 28, 30, and 32 of the <Table 1>. In the above examples, since the plurality of second and fourth patterns 102 and 104 directly receive electromotive force through electromagnetic induction caused by the stylus pen, there is no signal attenuation through capacitive coupling from the second pattern 102 to the first pattern 101 and from the fourth pattern 104 to the third pattern 103.

As a specific example, the sensor unit 100' of the touch input device according to the second embodiment has a size of about 10 to 14 inches, which is the size of the landscape-type tablet PC, and when the sensor unit 100' is implemented as with an example of No. 3 in the <Table 1> above, the number of total channels and the number of driving trace channels (TX Trace Channels) of the sensor unit 100' are summarized in <Table 3> below.

TABLE 3

| | Number of channels (about 10 inches or more) |
|---|---|
| Finger TX | 42 |
| Finger RX | 56 |
| Stylus TX | 42 |
| Top channel | 140 |
| TX Trace channel | 84 |

Figure 9:
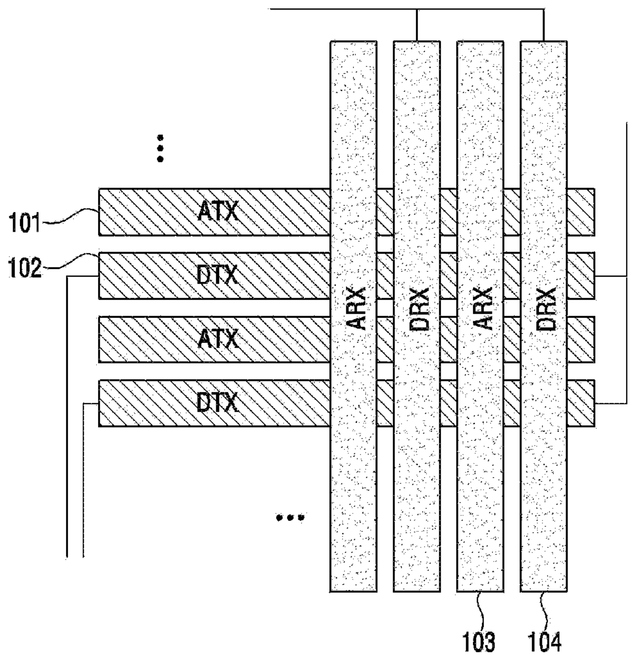
FIG. 9 is a schematic configuration view illustrating another example of the sensor unit 100' in FIG. 7.

In the <Table 3> above, the number of channels of Stylus TX is equal to that of the plurality of second patterns 102. This is because the number of the plurality of second patterns 102 is equal to that of the plurality of first patterns 101, and each of one ends of the plurality of second patterns 102 is individually connected to one conductive pattern as illustrated in FIG. 9.

In the <Table 3> above, the number of TX Trace channels is a sum of the number of channels of Finger TX and the number of channels of Stylus TX. The number of the TX Trace channels is a key factor in determining a thickness of a bezel in a minor axis of the touch input device. As the number of the TX Trace channels is reduced, the thickness of the bezel in the minor axis of the touch input device may be reduced.

The example of the above <Table 3> has a disadvantage in that the number of channels slightly increases compared to the above <Table 3>, but has an advantage in that a voltage value of the stylus sensing signal received by the control unit increases because the pen sensing signal emitted from the stylus pen is received through the plurality of second patterns 102. The present applicant confirms through experiments that the voltage value of the stylus sensing signal received by the control unit is approximately two times greater than that in the <Table 2>.

Also, since each of the plurality of second patterns 102 is one channel, when the plurality of second patterns 102 are used as the stylus driving electrode (Stylus TX), a distance between the channels is reduced by half in comparison with the example of <Table 2>, and a stylus driving resolution is improved.

As another specific example, when the sensor unit 100' of the touch input device according to the second embodiment has a size of about 10 to 14 inches, which is the size of the landscape-type tablet PC, and is implemented as with an example of No. 8 in the <Table 1> above, the number of total channels and the number of driving trace channels (TX Trace Channels) of the sensor unit 100' are summarized in <Table 4> below.

TABLE 4

| | Number of channels (about 10 inches or more) |
|---|---|
| Finger TX | 42 |
| Finger RX | 56 |
| Stylus TX | 56 |
| Top channel | 154 |
| TX Trace channel | 42 |

Figure 10:
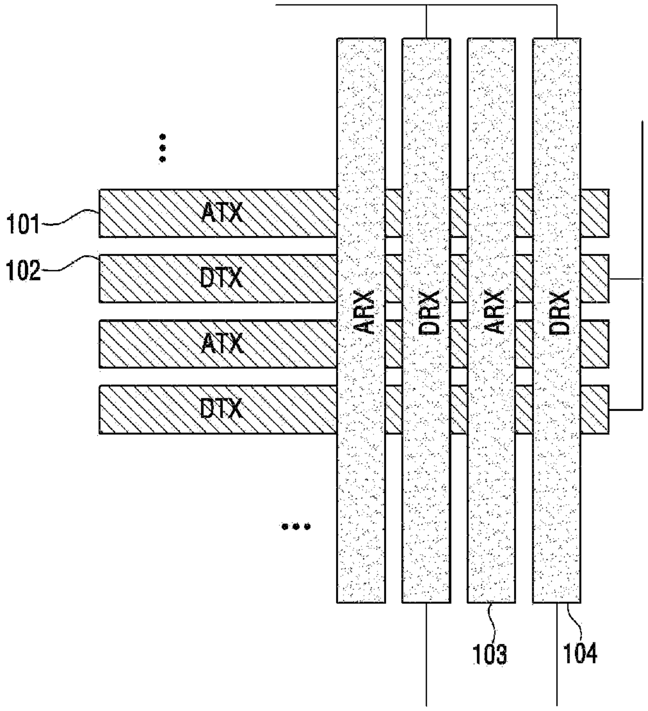
FIG. 10 is a schematic configuration view illustrating another example of the sensor unit 100' in FIG. 7.

In the <Table 4> above, the number of channels of the Stylus TX is equal to that of the plurality of fourth patterns 104. This is because the number of the plurality of fourth patterns 104 is equal to that of the plurality of third patterns 103, and each of one ends of the plurality of fourth patterns 104 is individually connected to one conductive pattern as illustrated in FIG. 10.

In the <Table 4> above, the number of the TX Trace channels is equal to that of the number of channels of the Finger TX. The number of the TX Trace channels is a key factor in determining a thickness of the bezel in the minor axis of the touch input device. As the number of the TX Trace channels is reduced, the thickness of the bezel in the minor axis of the touch input device may be reduced.

The example of the above <Table 4> has a disadvantage in that the number of total channels slightly increases compared to the above <Table 2>, but has an advantage in that a voltage value of the stylus pen sensing signal received by the control unit increases because the pen sensing signal emitted from the stylus pen is received through the plurality of fourth patterns 104.

Also, since each of the plurality of fourth patterns 104 is one channel, when the plurality of fourth patterns 104 are used as the stylus driving electrode (Stylus TX), a distance between the channels is reduced by half, and the stylus driving resolution is improved.

Also, since the number of the TX trace channels may be reduced to ¼ to ⅓ compared to the example in the <Table 2>, a thickness of a bezel B in the width direction of the touch input device may be reduced.

Figure 11:
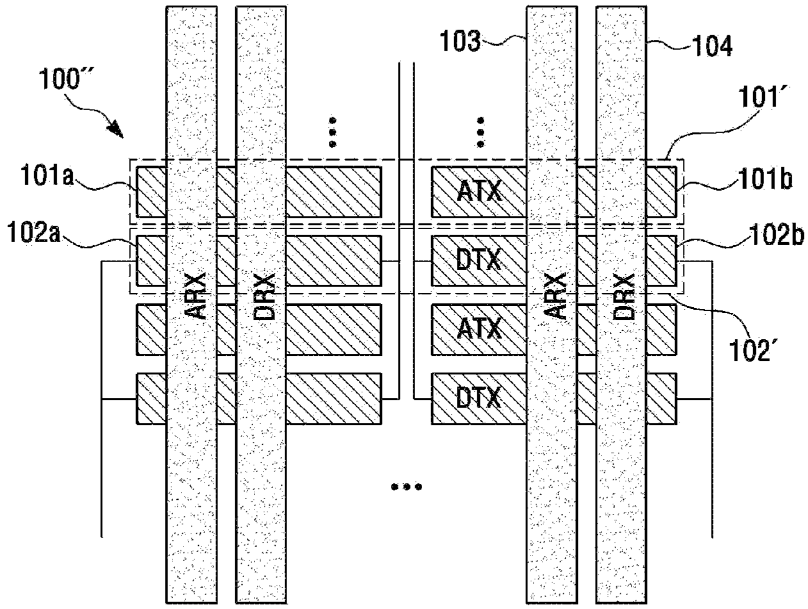
FIG. 11 is a schematic configuration view illustrating another example of the sensor unit 100' in FIG. 7.

FIG. 11 is a schematic configuration view illustrating another example of the sensor unit 100' in FIG. 7.

In a sensor unit 100" of FIG. 11, each first pattern 101' includes at least two or more first-a patterns 101*a* and first-b patterns 101*b*, and each second pattern 102' includes at least two or more second-a patterns 102*a* and second-b patterns 102*b*. A plurality of third and fourth patterns 103 and 104 are the same as those of the sensor unit 100 of FIG. 7.

The first-a pattern 101*a* and the first-b pattern 101*b* are arranged in an extension direction of the first pattern 101'. The second-a pattern 102*a* and the second-b pattern 102*b* are arranged in an extension direction of the second pattern 102'.

The other ends of the plurality of second-a patterns 102*a* are electrically connected, and the other ends of the plurality of second-b patterns 102*b* are electrically connected. Here, the other ends of the plurality of second-a patterns 102*a* face the other ends of the plurality of second-b patterns 102*b*.

One ends of two or more adjacent second-a patterns of the plurality of second-a patterns 102*a* may be electrically connected to each other. One ends of two or more adjacent second-b patterns of the plurality of second-b patterns 102*b* may be electrically connected to each other. Here, each of the one ends of the plurality of second-a patterns and the one ends of the plurality of second-b patterns is individually connected to a conductive pattern as illustrated in FIG. 9.

As a specific example, when the sensor unit 100" in FIG. 11 has a size of about 10 to 14 inches, which is the size of the landscape-type tablet PC, and is implemented as with the example of No. 1 in the <Table 1> above, the number of total channels and the number of driving trace channels (TX Trace Channels) of the sensor unit 100" are summarized in <Table 5> below.

TABLE 5

| | Number of channels (about 10 inches or more) |
|---|---|
| Finger TX | 84 |
| Finger RX | 56 |
| Stylus TX | 42 |
| Top channel | 182 |
| TX Trace channel | 126 |

In the <Table 5> above, the number of channels of Stylus TX is a value obtained by dividing the number of the plurality of second patterns 102' by 2. This is because the number of the plurality of second patterns 102' is equal to that of the plurality of first patterns 101', and two adjacent second patterns of the plurality of second patterns 102' are electrically connected to each other.

In the <Table 5> above, the number of TX Trace channels is a sum of the number of channels of Finger TX and the number of channels of Stylus TX. The number of TX Trace channels is a key factor in determining a thickness of the bezel in the minor axis of the touch input device. As the number of the TX Trace channels is reduced, the thickness of the bezel in the minor axis of the touch input device may be reduced.

The above <Table 5> has a disadvantage in that the number of channels slightly increases compared to the example of the <Table 2> above, but has an advantage in that an operating frequency bandwidth of each of the touch driving signal applied to the touch driving electrode and the pen driving signal for driving the stylus pen is widened by reducing a resistance value and a capacitance value of the sensor unit 100" because a length of each of the first pattern 101' and the second pattern 102' is reduced by half.

Figure 12:
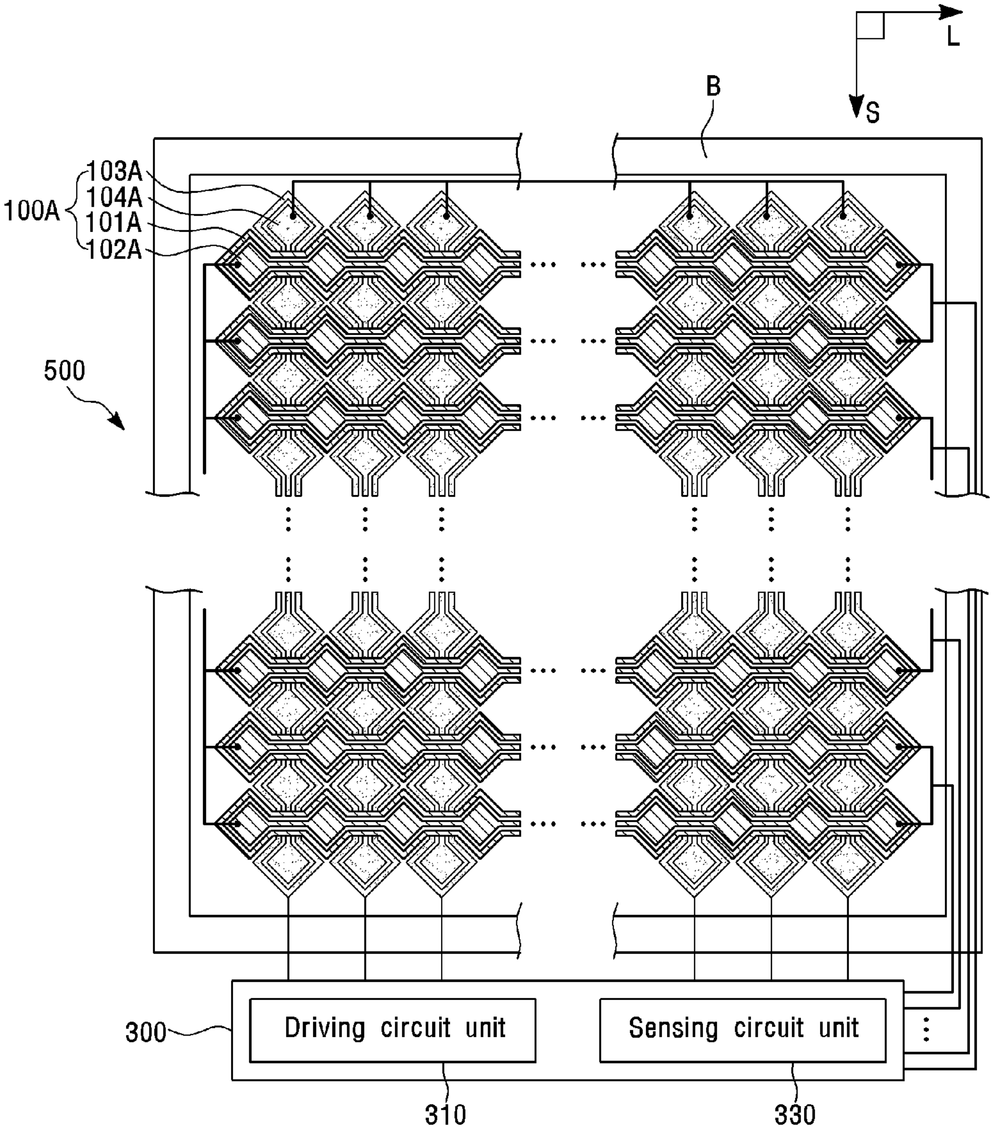
FIG. 12 is a view illustrating the touch input device in FIG. 8 in detail.

FIG. 12 is a view illustrating the touch input device in FIG. 8 in detail.

Referring to FIG. 12, a touch input device 500 may include a sensor unit 100A and a control unit 300 for controlling the sensor unit 100A.

The sensor unit 100A is an example of the sensor unit 100' in FIG. 8. Thus, the sensor unit 100A includes a plurality of first to fourth patterns 101A, 102A, 103A, and 104A.

The first pattern 101A has a shape extending in a first direction (or width direction). The first direction may be a major axis direction L of a screen of the touch input device. The first pattern 101A may also be referred to as Active TX (ATX).

The first pattern 101A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The first pattern 101A may have an opening in which the second pattern 102A is disposed. The opening may have a shape corresponding to an outer shape of the first pattern 101A. The first pattern 101A may have a structure surrounding the second pattern 102A. The first pattern 101A is spaced a predetermined distance from the second pattern 102A.

The second pattern 102A has a shape extending in the first direction, is disposed adjacent to the first pattern 101A and is spaced a predetermined distance from the first pattern 101A. The second pattern 102A may also be referred to as Dummy TX (DTX).

The second pattern 102A is disposed in the first pattern 101A.

The second pattern 102A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the second pattern 102A may have a shape corresponding to that of the main pattern part of the first pattern 101A, and the connection pattern part of the second pattern 102A may have a shape corresponding to that of the connection pattern part of the first pattern 101A.

The third pattern 103A has a shape extending in a second direction different from the first direction. The second direction may be a direction perpendicular to the first direction, and may be a minor axis direction of the screen of the touch input device. The third pattern 103A may also be referred to as Active RX (ARX).

The third pattern 103A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The third pattern 103A may have an opening in which the fourth pattern 104A is disposed. The opening may have a shape corresponding to an outer shape of the third pattern 103A. The third pattern 103A may have a structure surrounding the fourth pattern 104A. The third pattern 103A is spaced a predetermined distance from the fourth pattern 104A.

The fourth pattern 104A has a shape extending in the second direction, is disposed adjacent to the third pattern 103A, and is spaced a predetermined distance from the third pattern 103A. The fourth pattern 104A may also be referred to as Dummy RX (DRX).

The fourth pattern 104A is disposed in the third pattern 103A.

The fourth pattern 104A may includes the plurality of main pattern parts and the connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the fourth pattern 104A may have a shape corresponding to that of the main pattern part of the third pattern 103A, and the connection pattern part of the fourth pattern 104A may have a shape corresponding to that of the connection pattern part of the third pattern 103A.

The third and fourth patterns 103A and 104A are disposed on the first and second patterns 101A and 102A and are spaced a predetermined distance from the first and second patterns 101A and 102A. The sensor unit in which the first to fourth patterns are disposed on the same layer will be described in detail with reference to FIG. 15.

Although not shown in the drawing, one ends (first ends) of the plurality of first patterns 101A are electrically connected to the control unit 300, and the other ends (second ends) are electrically opened. Here, each of the one ends (first end) is relatively close to the control unit 300, and each of the other ends (second end) is relatively far from the control unit 300.

Although not shown in the drawing, each of the one ends of the plurality of first patterns 101A may be electrically connected to each other through the control unit 300 and the conductive pattern. The conductive patterns connecting the plurality of first patterns 101A and the control unit 300 may be arranged in the bezel B of a width direction of the touch input device 500.

Two adjacent one ends of the one ends (first ends) of the plurality of second patterns 102A may be electrically connected to each other by a first conductive pattern and then electrically connected to the control unit 300 through a second conductive pattern. The other ends (second ends) of the plurality of second patterns 102A are electrically connected to each other through the conductive pattern. Here, each of the one ends (first end) is relatively close to the control unit 300, and each of the other ends (second end) is relatively far from the control unit 300.

The second conductive patterns connecting the plurality of second patterns 102A and the control unit 300 may be arranged in the bezel B of the width direction of the touch input device 500 as illustrated in FIG. 12 Here, the second conductive patterns connecting the plurality of second patterns 102A and the control unit 300 may be arranged in the bezel B of the width direction of the touch input device 500 together with conductive patterns (not shown) connecting the plurality of first patterns 101A and the control unit 300.

When the other ends of the plurality of second patterns 102A are electrically connected to each other, a total impedance is reduced because capacitances for respective second patterns 102A are added. Thus, an effect in which each of the other ends of the plurality of second patterns 102A is AC GND is obtained.

Although not shown in the drawings, the other ends of the plurality of second patterns 102A, which are electrically connected to each other, may be grounded. Also, although not shown in the drawings, the other ends of the plurality of second patterns 102A may not be electrically connected to each other, and a predetermined capacitor may be connected to each of the other ends of the second patterns 102A.

The plurality of first patterns 101A and the plurality of second patterns 102A may be disposed on the same layer. The first pattern 101A and the second pattern 102A may be formed on the same layer by using a metal mesh.

Although not shown in the drawing, one ends (first ends) of the plurality of third patterns 103A are electrically connected to the control unit 300, and the other ends (second ends) are electrically opened. Here, each of the one ends (first end) is relatively close to the control unit 300, and each of the other ends (second end) is relatively far from the control unit 300. The one ends of the plurality of third patterns 103A may be electrically connected to the control unit 300 through a conductive pattern.

One ends (or first ends) of the plurality of fourth patterns 104A may be electrically opened. Here, the other ends (second ends) of the plurality of fourth patterns 104A may be electrically connected to each other in the same manner as the plurality of second patterns 102A. Here, each of the one ends (first end) is relatively close to the control unit 300, and each of the other ends (second end) is relatively far from the control unit 300.

Although not shown in the drawings, the other ends of the plurality of second patterns 104A, which are electrically connected to each other, may be grounded. Also, the other ends of the plurality of fourth patterns 104A may not be electrically connected to each other, and a predetermined capacitor may be connected to each of the other ends of the fourth patterns 104A.

The plurality of third patterns 103A and the plurality of fourth patterns 104A may be disposed on the same layer. The third pattern 103A and the fourth pattern 104A may be formed on the same layer by using a metal mesh. Here, the third pattern 103A and the fourth pattern 104A may be disposed on a layer different from that of the first pattern 101A and the second pattern 102A. For example, the third pattern 103A and the fourth pattern 104A may be disposed on a first layer, and the first pattern 101A and the second pattern 102A may be disposed on a second layer that is different from the first layer. The sensor unit in which the first to fourth patterns are disposed on the same layer will be described in detail with reference to FIG. 15.

The control unit 300 may be electrically connected to the sensor unit 100A and control an operation of the sensor unit 100A. The control unit 300 and the sensor unit 100A may be electrically connected to each other through a conductive pattern.

The control unit 300 may include a plurality of driving circuit units 310 and a plurality of sensing circuit units 330.

The plurality of driving circuit units 310 may include a driving circuit unit providing a touch sensing signal for sensing a position of a touch of an object such as a finger to the plurality of first patterns 101A and a driving circuit unit providing a pen driving signal for driving the stylus pen.

The plurality of sensing circuit units 330 may include a sensing circuit unit for detecting a position of a touch of an object such as a finger by receiving a sensing signal through the plurality of third patterns 103A and a sensing circuit unit for sensing the stylus pen. Here, some sensing circuit units among the plurality of sensing circuit units may perform touch position sensing in addition to stylus pen sensing.

The control unit 300 may control the sensor unit 100A to operate in one of the touch sensing mode, the antenna driving mode, and the stylus pen sensing mode. The control unit 300 may selectively electrically connect the plurality of driving/sensing circuit units 310 and 330 to the sensor unit 100A according to each mode. To this end, the control unit 300 may include a plurality of switches electrically connecting the plurality of driving/sensing circuit units 310 and 330 to the sensor unit 100A according to a command of the control unit 300.

An operation mode of the touch input device 500 in FIG. 12 will be described in detail. Here, since the example of No. 1 in the above <Table 1> is illustrated in FIG. 12, a description will be provided based on the example.

In the touch driving/sensing mode, the control unit 300 may electrically connect the plurality of driving circuit units 310 to the plurality of first patterns 101A of the sensor unit 100A to sense a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for touch position sensing to the plurality of third patterns 103A of the sensor unit 100A. The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the outputted voltage value to detect a touch position.

In the touch driving/sensing mode, the control unit 300 may electrically connect the plurality of driving circuit units 310 to the plurality of second patterns 102A to prevent capacitive coupling from being generated between the plurality of first patterns 101A and the plurality of second patterns 102A. Here, the control unit 300 may control the same driving signal as the driving signal applied to the plurality of first patterns 101A to be applied to the plurality of second patterns 102A. Also, the control unit 300 may control a predetermined reference potential to be applied to the plurality of second patterns 102A when the driving signal is applied to the plurality of first patterns 101A.

In the antenna driving mode (or stylus driving mode, or stylus uplink mode), the control unit 300 electrically connect the plurality of driving circuit units 310 for driving the antenna to the plurality of second patterns 102A of the sensor unit 100A. The control unit 300 may control the plurality of switches to electrically connect the conductive patterns connected to the plurality of second patterns 102A with the plurality of driving circuit units 310.

The control unit 300 may control a driving signal (or pen driving signal) outputted from each driving circuit unit 310 connected to the plurality of second patterns 102A. For example, the control unit 300 may control: a pulse signal having a predetermined frequency to be outputted from a first driving circuit unit; any pulse signal not to be outputted from a second driving circuit unit; and a reverse pulse signal having a phase opposite to that of the pulse signal outputted from the first driving circuit unit to be outputted from the third driving circuit unit, among the plurality of driving circuit units connected to the plurality of second patterns 102A. In this case, a current loop is formed by the second pattern electrically connected to the first driving circuit unit and the second pattern electrically connected to the third driving circuit unit. A magnetic field is generated by the formed current loop, and the stylus pen adjacent to the sensor unit 100A may be driven by the magnetic field.

The control unit 300 may control opposite driving signals to be outputted from two random driving circuit units among the plurality of driving circuit units 310 electrically connected to the plurality of second patterns 102A. Thus, the control unit 300 may variously change and set a size and a position of the current loop. For example, when the control unit 300 detects a position of the stylus pen adjacent to the sensor unit 100A, the control unit 300 may control opposite driving signals to be outputted from the driving circuit unit electrically connected to two second patterns disposed around the position of the stylus pen, and when the control unit 300 does not detect the position of the stylus pen, the control unit 300 may control opposite driving signals to be outputted from the driving circuit unit electrically connected to two second patterns disposed both outermost portions among the plurality of second patterns 102A.

Figure 13:
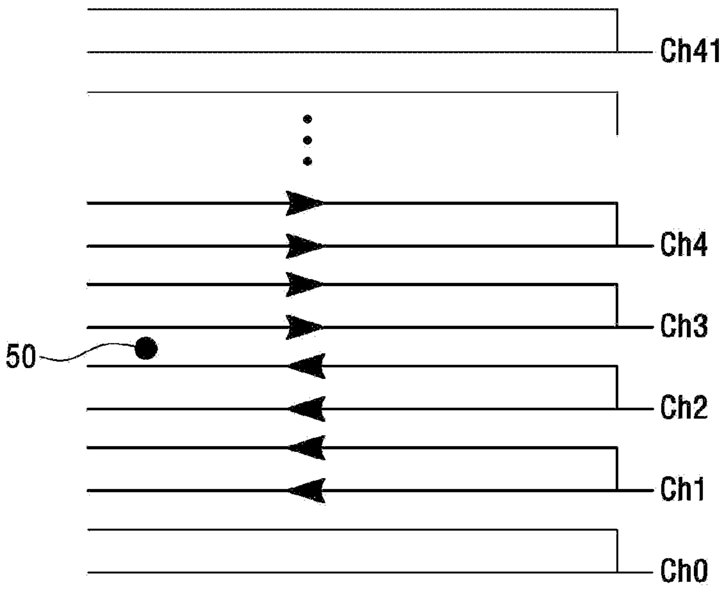
FIG. 13 is a view for explaining a method by which a control unit 300 applies a pen driving signal for driving the stylus pen to a plurality of second patterns 102A.

FIG. 13 is a view for explaining a method by which the control unit 300 applies a pen driving signal for driving the stylus pen to the plurality of second patterns 102A; For reference, in FIG. 13, one second pattern 102A in FIG. 12 is simply illustrated as one line Ch, and each line Ch is one channel.

As illustrated in FIG. 13, two adjacent second patterns are electrically connected to form one channel. In this configuration, the same signal is applied to the two electrically connected second patterns. FIG. 13 is a view illustrating a state in which 84 second patterns are connected by two to form 42 channels Ch0, Ch1, . . . . Ch41.

For example, when the stylus pen 50 is disposed between a second channel Ch2 and a third channel Ch3 among the 42 channels Ch0, Ch1, . . . . Ch41, the control unit 300 may control a pen driving signal to be outputted to one or more channels disposed at a side of the second channel Ch2 based on the stylus pen 50 and a pen driving signal having an inverted phase of the above-described pen driving signal to one or more channels disposed at a side of the third channel Ch3 based on the stylus pen 50.

In the stylus sensing mode (or stylus downlink mode), the control unit 300 may electrically connect the plurality of sensing circuit units 330 for stylus sensing to the plurality of first patterns 101A and the plurality of third patterns 103A of the sensor unit 100A. The control unit 300 may control the plurality of switches to electrically connect the conductive patterns connected to the plurality of first and third patterns 101A and 103A with the plurality of sensing circuit units 330.

The touch input device 500 according to an embodiment of the present invention has an advantage in that an output voltage value of the plurality of sensing circuit units 330 is hardly changed according to the position of the stylus pen on the sensor unit 100A in the stylus sensing mode due to the configuration of the sensor unit 100A. A specific principle for this will be described with reference to FIG. 14A, FIG. 14B, FIG. 14C, FIG. 14D, FIG. 14E, and FIG. 14F.

FIG. 14A, FIG. 14B, FIG. 14C, FIG. 14D, FIG. 14E, and FIG. 14F are schematic views for explaining an operation principle of the stylus sensing mode in the touch input device of FIG. 12.

Figures 14A, 14B, 14C, 14D, 14E, 14F:
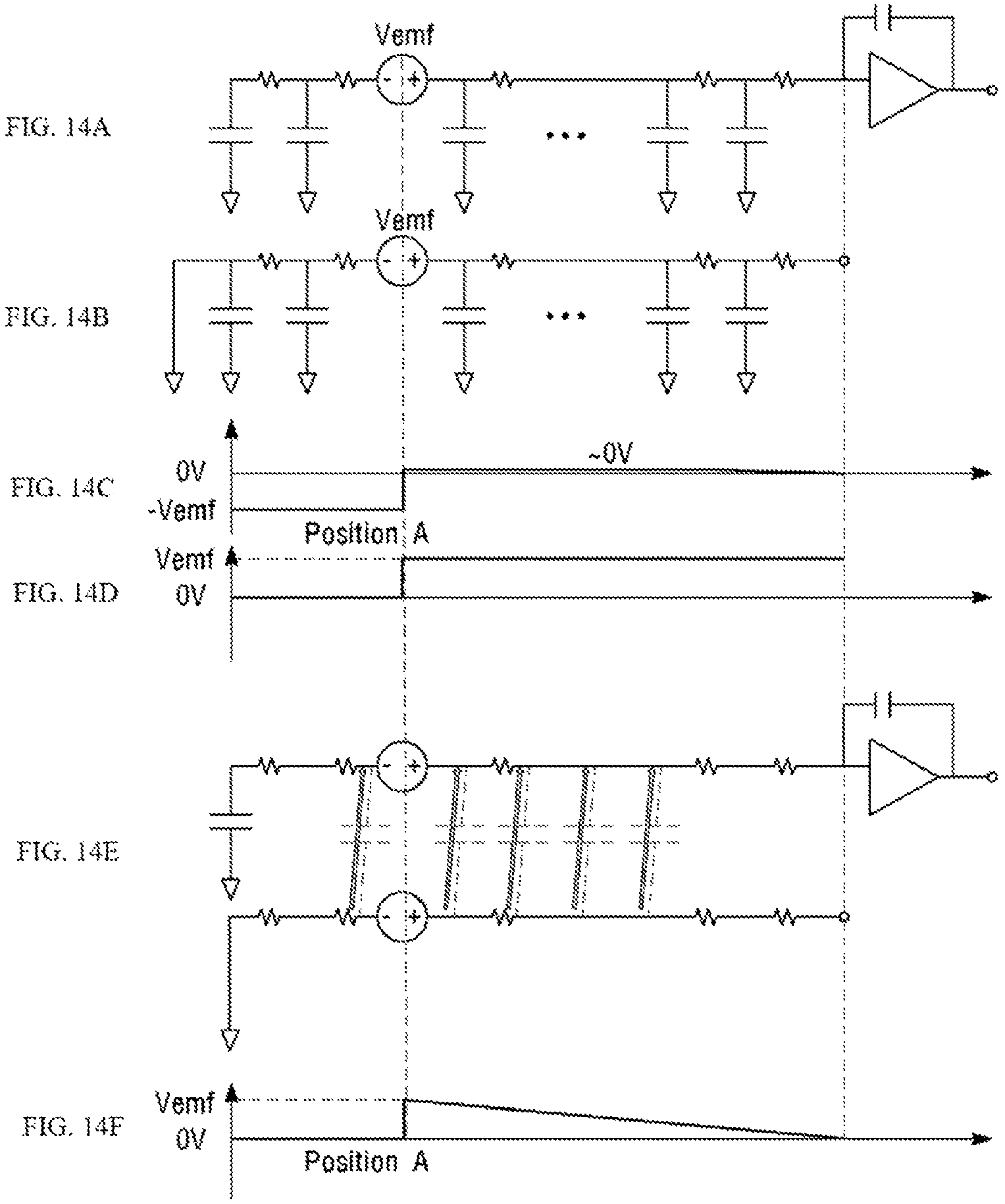
FIG. 14A, FIG. 14B, FIG. 14C, FIG. 14D, FIG. 14E, and FIG. 14F are schematic views for explaining an operation principle of a stylus sensing mode in the touch input device of FIG. 12.

FIG. 14A is a schematic circuit diagram of modeling one first pattern 101A in FIG. 12 and the sensing circuit unit of the control unit 300 electrically connected thereto, and FIG. 14B is a schematic circuit diagram of modeling the second pattern 102A disposed in one first pattern 101A. FIG. 14C is a voltage distribution graph in the circuit diagram of FIG. 14A, and FIG. 14D is a voltage distribution graph in the circuit diagram of FIG. 14B.

Referring to FIG. 14A and FIG. 14C, when the stylus pen approaches an arbitrary point A spaced away from the sensing circuit unit 330 on the first pattern 101A, a voltage Vemf (hereinafter, referred to as an 'induced voltage') induced by a signal emitted from the stylus pen is generated at the corresponding point A. When the induced voltage Vemf is generated at the point A, since an equivalent capacitance of the first pattern 101A viewed from the point A to the left side decreases, an equivalent impedance increases. Thus, as most of the induced voltage Vemf is applied to the left side of the point A, and a voltage of about 0 V is applied to the right side of the point A, almost no current flows. Furthermore, as the voltage of about 0 V applied to the right side of the point A gradually decreases by equivalent resistances of the first pattern 101A, almost no voltage is applied to an input terminal of the sensing circuit unit.

Referring to FIG. 14B and FIG. 14D, when the induced voltage Vemf is generated at the point A, since the other ends of each second pattern 102A are electrically connected to each other on the left side of the point A, an equivalent capacitance viewed from the point A to the left side increases, and an equivalent impedance approaches almost 0. Thus, a voltage of 0 V is applied to the left side of the point A, and the voltage Vemf is applied to the right side of the point A without causing a voltage drop at equivalent resistors because one end of the second pattern 102A is opened.

When FIG. 14C and FIG. 14D are compared, it may be known that a potential difference as much as the voltage Vemf exists at any position between the first pattern 101A and the second pattern 102A. The potential difference as much as the voltage Vemf between the first pattern 101A and the second pattern 102A causes capacitive coupling between the first pattern 101A and the second pattern 102A. As illustrated in FIG. 14E, current flows from the second pattern 102A to the first pattern 101A by the capacitive coupling. Although current generated from the first pattern 101A itself gradually decreases as a distance from the position of the stylus pen to the sensing circuit unit of the control unit 300 increases, since current is introduced to the first pattern 101A from the second pattern 102A, current outputted from the first pattern 101A to the sensing circuit unit 330 of the control unit 300 has almost no difference from the position of the pen. Thus, the control unit 300 may sense the position of the stylus pen through the sensing circuit unit 330 electrically connected to the first pattern 101A.

As illustrated in FIG. 14A to FIG. 14E, it may be known that a potential difference between the first pattern 101A and the second pattern 102A is constant as the voltage Vemf although the point A moves to the left or right side. Thus, the control unit 300 may sense the stylus pen from a constant signal outputted from the sensing circuit unit 330 regardless of whether the position of the stylus pen on the sensor unit 100A is close to or far from the sensing circuit unit.

Although the current is introduced to the first pattern 101A from the second pattern 102A by the capacitive coupling in a description of FIG. 14E, the embodiment of the present invention is not limited thereto. For example, current may be also introduced to the first pattern 101A from the second pattern 102A by magnetic coupling (magnetic field coupling).

The principle of FIG. 14A to FIG. 14E described above is directly applied to any one of the third pattern 103 and the fourth pattern 104 in the second direction. Also, the principle is directly applied to the touch input device according to the first embodiment in FIG. 4.

FIG. 14F is a voltage distribution graph when the sensing circuit unit 330 is connected to a right open terminal of the modeled circuit diagram of the second pattern 102A in FIG. 14B. That is, the voltage distribution graph of FIG. 14F illustrates a case in which one end of the second pattern 102A is connected to the sensing circuit unit 330 of the control unit 300. When FIG. 14F and FIG. 14D are compared, in case of FIG. 14E, a voltage drop is gradually generated by equivalent resistors in a direction toward the right side of the point A. Thus, in the case of FIG. 14E, since a potential difference as much as the voltage Vemf between the first pattern and the second pattern is not maintained, current may not flow from the second pattern to the first pattern as with FIG. 14E. Thus, the current outputted from the first pattern gradually decreases as the position of the pen moves away from the control unit 300. In the stylus sensing mode, one end of the second pattern 102A may be opened and floated.

While there is no problem when the screen of the touch input device in FIG. 12 has a size of the screen of the smartphone, e.g., 6.9 inches, when the size of the screen of the touch input device in FIG. 12 increases to 10 inches or 14 inches that is the size of the screen of a tablet PC, the sensor unit 100A also increases, so that a resistance value and a capacitance value of the sensor unit 100A increase. The increase in the resistance and capacitance values causes the operating frequency bandwidth of each of the touch drive signal applied to the touch drive electrode and the pen drive signal for driving the stylus pen to be much narrower than that of the smartphone (6.9 inches). Thus, an operating frequency bandwidth required for design is not obtained.

In addition, the pen sensing signal received from the stylus pen is also attenuated as much as the sensor unit 100A increases. In particular, a voltage value necessary for design is not outputted from the sensor unit 100A because the pen sensing signal at a portion farthest from the control unit 300 is attenuated in a process of being transmitted to the control unit 300.

Hereinafter, touch input devices capable of solving the above-described limitations will be described.

Figure 15:
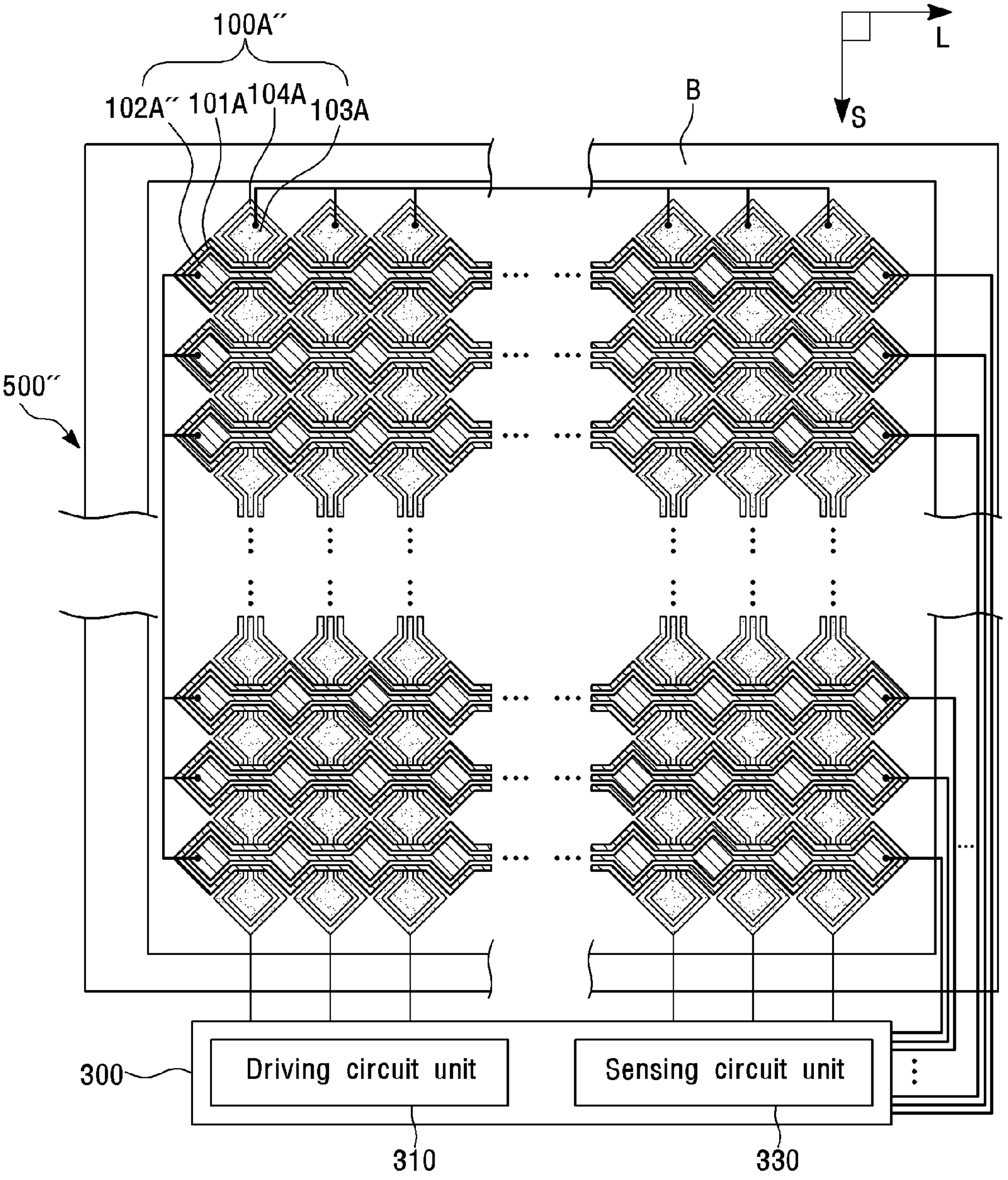
FIG. 15 is a view illustrating the touch input device in FIG. 9 in detail.

FIG. 15 is a view illustrating the touch input device in FIG. 9 in detail.

Referring to FIG. 15, a touch input device 500" may include a sensor unit 100A" and the control unit 300 for controlling the sensor unit 100A".

The sensor unit 100A" includes the plurality of first to fourth patterns 101A, 102A", 103A, and 104A. Here, since the plurality of first, third, and fourth patterns 101A, 103A, and 104A are the same as the plurality of first, third, and fourth patterns 101A, 103A, and 104A illustrated in FIG. 12, a description thereof will be omitted.

Hereinafter, the plurality of second patterns 102A" will be described, a description on the same portion as the plurality of second patterns 102A of FIG. 12 will be omitted for convenience.

Each of one ends (first ends) of the plurality of second patterns 102A" may be electrically connected to the control unit 300 by a conductive pattern. This aspect is different from the plurality of second patterns 102A.

The other ends (second ends) of the plurality of second patterns 102" are electrically connected to each other through a conductive pattern. Here, each of the one ends is relatively close to the control unit 300, and each of the other ends is relatively far from the control unit 300.

An operation mode of the touch input device 500" in FIG. 15 will be described in detail.

In the touch driving/sensing mode, the control unit 300 may electrically connect the plurality of driving circuit units 310 to the plurality of first patterns 101A of the sensor unit 100A" for sensing a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for sensing a position of a touch to the plurality of third patterns 103A of the sensor unit 100A". The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the outputted voltage value to detect a touch position.

In the antenna driving mode (or stylus driving mode, or stylus uplink mode), the control unit 300 may electrically connect the plurality of driving circuit units 310 for antenna driving to the plurality of second patterns 102A" of the sensor unit 100A". The control unit 300 may control a plurality of switches to electrically connect the conductive patterns connected to the plurality of second patterns 102A" with the plurality of driving circuit units 310.

The control unit 300 may control a driving signal (or pen driving signal) outputted from each driving circuit unit 310 connected to the plurality of second patterns 102A". The control unit 300 may control opposite pulse signals to be outputted from two random driving circuit units among the plurality of driving circuit units 310 electrically connected to the plurality of second patterns 102A". Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of second patterns 101A" and the plurality of third patterns 103A of the sensor unit 100A". This aspect is different from the stylus sensing mode of the touch input device in FIG. 12.

The control unit 300 may control a plurality of switches to electrically connect the conductive patterns connected to the plurality of second patterns 101A" and the plurality of third patterns 103A with the plurality of sensing circuit units 330.

When compared with the touch input device in FIG. 12, the touch input device 500" in FIG. 15 is different in that the plurality of second patterns 102A" of the sensor unit 100A" is connected to the control unit 300. That is, the plurality of second patterns 102A of FIG. 12 are connected to the control unit 300 through the second conductive pattern after two adjacent second patterns are electrically connected by the first conductive pattern, each of the plurality of second patterns 102A" of FIG. 15 is connected to the control unit 300 by a conductive pattern. This configuration feature has a disadvantage in that the number of channels of the touch input device 500" in FIG. 15 increases compared to the touch input device 500 in FIG. 12, but has an advantage of reducing power consumption because the pen driving signal is applied only to a specific portion at which the stylus pen is disposed in the antenna mode for driving the stylus pen.

Also, while in the touch input device 500 in FIG. 12, in the stylus sensing mode, a pattern for sensing a signal emitted from the stylus pen is the plurality of first patterns 101A in the major axis direction L and the plurality of third patterns 103A in the minor axis direction S, in the touch input device 500" in FIG. 15, in the stylus sensing mode, a pattern for sensing a signal emitted from the stylus pen is the plurality of second patterns 102A" in the major axis direction L and the plurality of third patterns 103A in the minor axis direction S.

When the in the touch input device 500" in FIG. 15, in the stylus sensing mode, a pattern for sensing a signal emitted from the stylus pen is the plurality of second patterns 102A" in the major axis direction L instead of the plurality of first patterns 101A, coupling capacitance between the first patterns 101A and the second patterns 102A" may be reduced compared to the touch input device 500 in FIG. 12. Thus, an operating frequency bandwidth of the touch driving signal and the touch sensing signal for sensing a touch position may be improved, and an operating frequency bandwidth of the pen driving signal for driving the stylus pen may be improved.

Also, since the control unit 300 receives the pen sensing signal from the stylus pen through the plurality of second patterns 102A" in the stylus pen sensing mode, a voltage value of the received pen sensing signal is relatively high. Particularly, since, in the major axis direction L, a voltage value of the pen sensing signal received from a point spaced farthest from the control unit 300 is relatively greater than that in case of FIG. 12, sensing sensitivity may be improved. This is because the capacitive coupling between the first pattern 101A and the second pattern 102A is unnecessary to be considered. Specifically, in case of FIG. 12, as described above in FIG. 14E, since current flows from the second pattern 102A to the first pattern 101A by the capacitive coupling between the first pattern 101A and the second pattern 102A, the pen sensing signal inputted to the control unit 300 through the first pattern 101A is attenuated. However, since in the touch input device 500" in FIG. 15, the pen sensing signal is directly inputted to the control unit 300 through the second pattern 102A" instead of the first pattern 101A without the capacitive coupling, the attenuation of the pen sensing signal caused by the capacitive coupling does not occur.

Also, since each of the plurality of second patterns 102A" is one channel, when the plurality of second patterns 102A" are used as the stylus driving electrode (Stylus TX), a distance between the channels is reduced by half, and the stylus driving resolution is improved.

Figure 16:
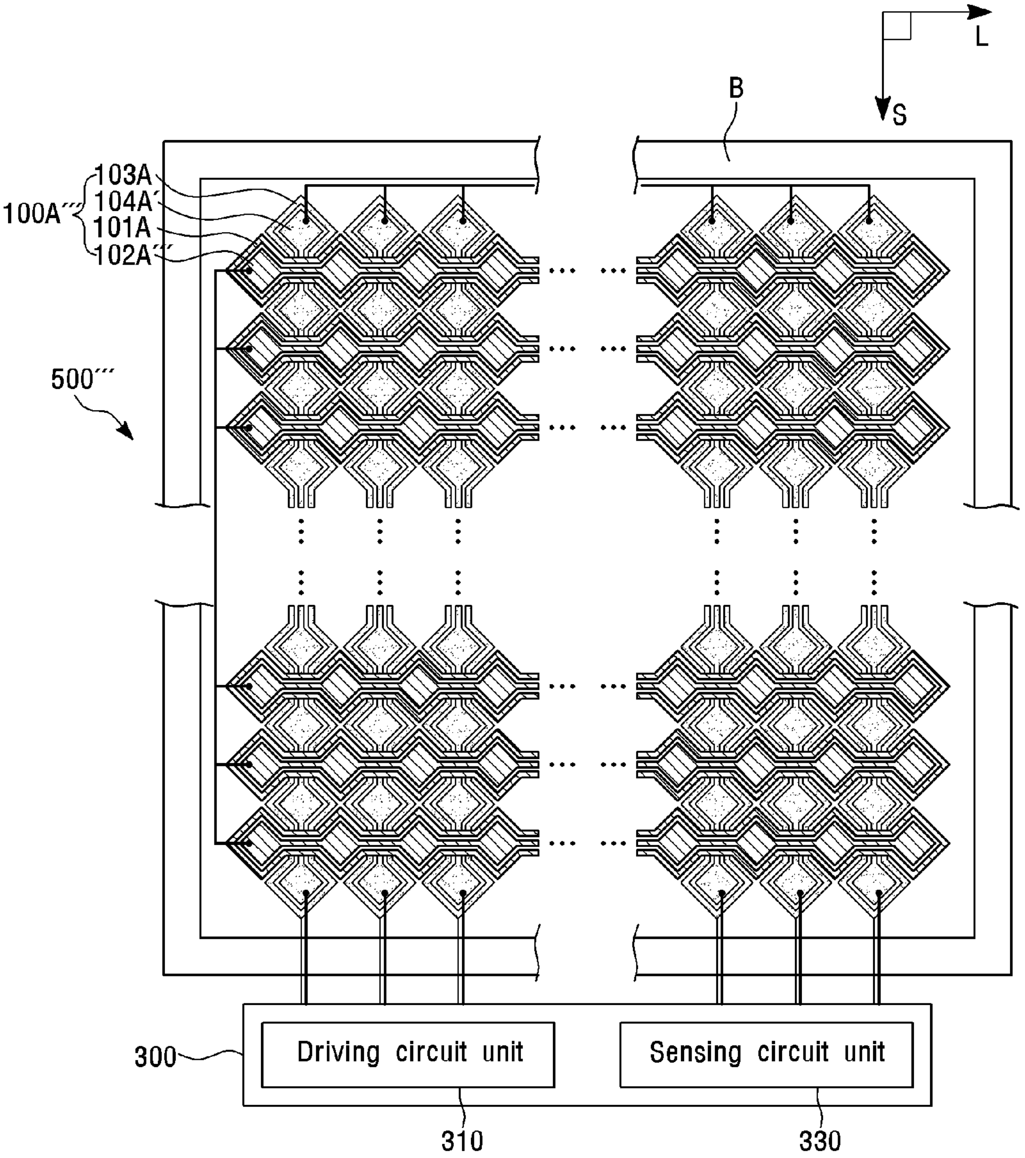
FIG. 16 is a view illustrating the touch input device in FIG. 10 in detail.

FIG. 16 is a view illustrating the touch input device in FIG. 10 in detail.

Referring to FIG. 16, a touch input device 500''' may include a sensor unit 100A''' and a control unit 300 for controlling the sensor unit 100A'''.

The sensor unit 100A''' includes a plurality of first to fourth patterns 101A, 102A''', 103A, and 104A'. Here, since the plurality of first and third patterns 101A and 103A are the same as the plurality of first and third patterns 101A and 103A in FIG. 12, a description thereof will be omitted.

Hereinafter, while the plurality of second and fourth patterns 102A''' and 104A' are described, a description on the same portions as the plurality of second and fourth patterns 102A and 104A of FIG. 12 will be omitted for convenience.

One ends of the plurality of second patterns 102A''' are floated, the other ends of the plurality of second pattern 102A''' may be electrically connected to each other through a conductive pattern. Here, each of the one ends is relatively close to the control unit 300, and each of the other ends is relatively far from the control unit 300.

Each of one ends of the plurality of fourth patterns 104A' is electrically connected to the control unit 300 through a conductive pattern, the other ends of the plurality of fourth patterns 104A' are electrically connected to each other through a conductive pattern. Here, each of the one ends is relatively close to the control unit 300, and each of the other ends is relatively far from the control unit 300.

An operation mode of the touch input device 500'' in FIG. 16 will be described in detail.

In the touch driving/sensing mode, the control unit 300 may electrically connect the plurality of driving circuit units 310 to the plurality of first patterns 101A of the sensor unit 100A''' for sensing a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for sensing a position of a touch to the plurality of third pattern 103A of the sensor unit 100A'''. The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the outputted voltage value to detect a touch position.

In the antenna driving mode (or stylus driving mode, or stylus uplink mode), the control unit 300 may electrically connect the plurality of driving circuit units 310 for antenna driving to the plurality of fourth patterns 104A' of the sensor unit 100A'''. The control unit 300 may control a plurality of switches to electrically connect the conductive patterns connected to the plurality of fourth patterns 104A' with the plurality of driving circuit units 310.

The control unit 300 may control a driving signal (or pen driving signal) outputted from each driving circuit unit 310 connected to the plurality of fourth patterns 104A'. The control unit 300 may control opposite driving signals to be outputted from two random driving circuit units among the plurality of driving circuit units 310 electrically connected to the plurality of fourth 104A'. Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of first patterns 101A of the sensor unit 100A''' and the plurality of fourth patterns 104A'. This aspect is different from the stylus sensing mode of the touch input device in FIG. 12.

The control unit 300 may control a plurality of switches to electrically connect the conductive patterns connected to the plurality of first patterns 101A and the plurality of fourth patterns 104A' with the plurality of sensing circuit units 330.

When compared with the touch input device in FIG. 12, the touch input device 500''' in FIG. 16 is different in that the plurality of second patterns 102A''' of the sensor unit 100A''' are not used to electrically float and drive the stylus pen through the plurality of fourth patterns 104A'. This configuration has a disadvantage in that the number of channels of the touch input device 500''' in FIG. 16 increases compared to that of the touch input device 500 in FIG. 12, but has an advantage in that conductive patterns connected to the one ends of the plurality of second patterns 102A are not provided because the plurality of second patterns 102A are not used. Thus, a thickness of the left/right bezel B may be remarkably reduced compared to that of FIG. 12.

The touch input device in FIG. 16 has a disadvantage in that the number of total channels slightly increases compared to the touch input device in FIG. 12, but has an advantage in that a voltage value of the stylus pen sensing signal received by the control unit 300 increases because the pen sensing signal emitted from the stylus pen is directly received through the plurality of fourth patterns 104A'. The voltage value of the pen sensing signal received by the control unit 300 of the touch input device in FIG. 12 increases by approximately two times.

Also, since each of the plurality of fourth patterns 104A' is one channel, when the plurality of fourth patterns 104A' are used as the stylus driving electrode (Stylus TX), a distance between the channels is reduced by half than the touch input device of FIG. 12, and the stylus driving resolution is improved.

Also, since the number of the TX trace channels may be reduced to ¼ to ⅓ compared to the touch input device in FIG. 12, a thickness of a bezel B may be reduced.

Figure 17:
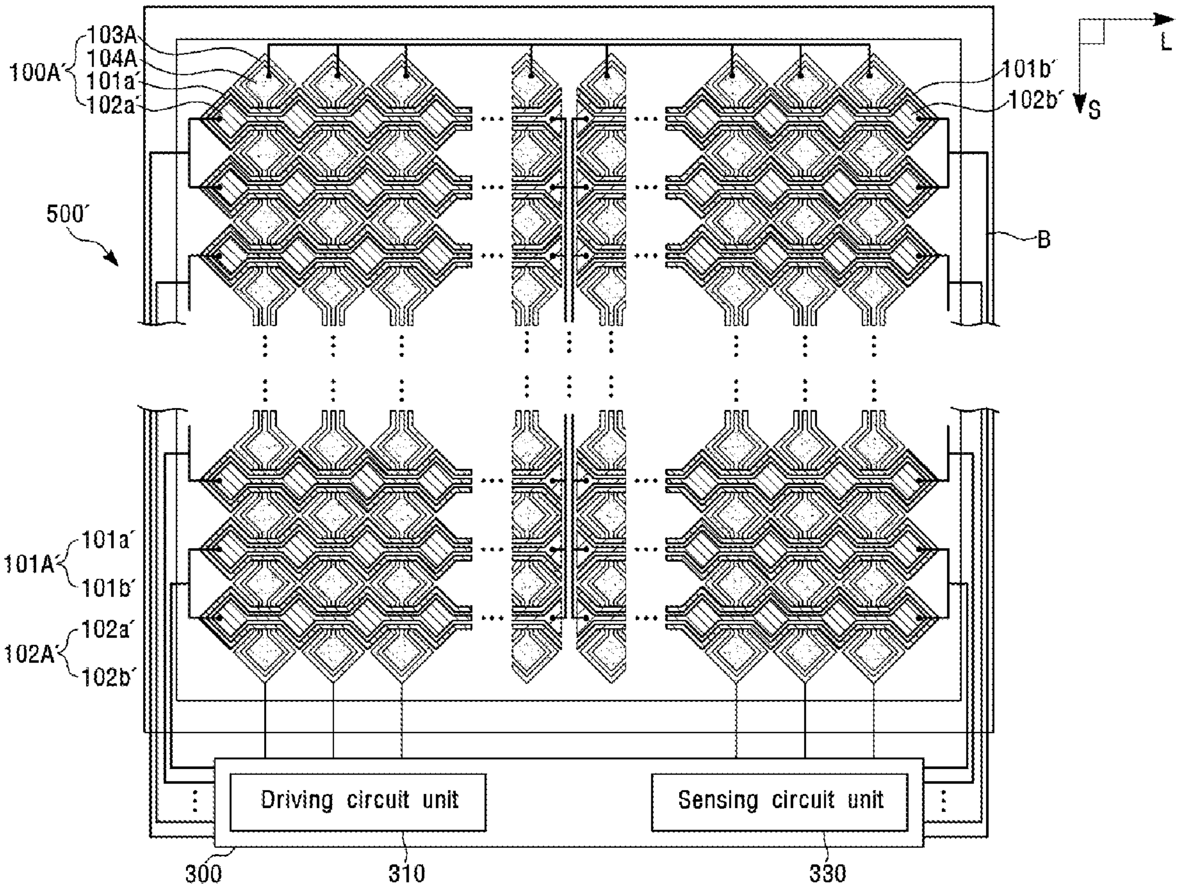
FIG. 17 is a view illustrating the touch input device in FIG. 11 in detail.

FIG. 17 is a view illustrating the touch input device in FIG. 11 in detail.

Referring to FIG. 17, a touch input device 500' may include a sensor unit 100A'' and the control unit 300 for controlling the sensor unit 100A'

The sensor unit 100A'' includes the plurality of first to fourth patterns 101A', 102A', 103A, and 104A. Here, since the plurality of third and fourth patterns 103A and 104A are the same as the plurality of third and fourth patterns 103A and 104A in FIG. 12, a description thereof will be omitted.

Hereinafter, the plurality of second patterns 102A'' will be described, an a description on the same portion as the plurality of second patterns 101A, 102A of FIG. 12 will be omitted for convenience.

The first pattern 101A' has a shape extending in the first direction. The first direction may be a major axis direction L of the screen of the touch input device. The first pattern 101A' includes a first-a pattern 101*a*' and a first-b pattern 101*b*'. The first-a pattern 101*a*' and the first-b 101*b*' are arranged along the first direction and spaced a predetermined distance from each other. The first pattern 101A' including the first-a pattern 101*a*' and the first-b 101*b*' may be referred to as Active TX (ATX).

The second pattern 102A' has a shape extending in the first direction, is disposed adjacent to the first pattern 101A' and is spaced a predetermined distance from the first pattern 101A'. The second pattern 102A' includes a second-a pattern 102*a*' and a second-b pattern 102*b*'. The second-a pattern 102*a*' and the second-b 102*b*' are arranged along the first direction and spaced a predetermined distance from each other. The second pattern 102A' including the second-a pattern 102*a*' and the second-b 102*b*' may be referred to as Dummy TX (DTX).

In the plurality of first patterns 101A', a plurality of first-a patterns 101*a*' have one ends electrically connected to the control unit 300 and the other ends that are electrically opened. Also, a plurality of first-b patterns 101*b*' have one ends electrically connected to the control unit 300 and the other ends that are electrically opened. Here, each of the one ends is relatively close to the control unit 300, and each of the other ends is relatively far from the control unit 300.

The respective one ends of the plurality of first-a patterns 101*a*' may be electrically connected to each other through the control unit 300 and a conductive pattern. The conductive patterns connecting the plurality of first-a patterns 101*a*' and the control unit 300 may be arranged along a minor axis direction S in the bezel B of the touch input device 500'.

The one ends of the plurality of first-b patterns 101*b*' may be electrically connected to each other through the control unit 300 and a conductive pattern. The conductive patterns connecting the plurality of first-b patterns 101*b*' and the control unit 300 may be arranged along the minor axis S in the bezel B of the touch input device 500.

In the plurality of second patterns 102A', two adjacent one ends of the one ends of the plurality of second-a patterns 102*a*' are electrically connected to each other by a first conductive pattern and then electrically connected to the control unit 300 through a second conductive pattern, and the other ends of the plurality of second-a patterns 102*a*' are electrically connected to each other through the conductive pattern. Likewise, two adjacent one ends of the one ends of the plurality of second-b patterns 102*b*' are electrically connected to each other and then electrically connected to the control unit 300 through the second conductive pattern, and the other ends of the plurality of second-b patterns 102*b*' are electrically connected to each other through the conductive pattern. Here, each of the one ends is relatively close to the control unit 300, and each of the other ends is relatively far from the control unit 300.

The second conductive patterns connecting the plurality of second-a and second-b patterns 102*a*' and 102*b*' and the control unit 300 are arranged along the minor axis direction S in the bezel B of the touch input device 500'. Here, the second conductive patterns connecting the plurality of second-a and second-b patterns 102*a*' and 102*b*' and the control unit 300 may be arranged in the bezel B of the of the touch input device 500' together with conductive patterns (not shown) connecting the plurality of first patterns 101A' and the control unit 300.

When the other ends of the plurality of second-a patterns 102*a*' are electrically connected to each other, a total impedance is reduced because capacitances for respective second-a patterns 102*a*' are added. Thus, an effect in which each of the other ends of the plurality of second-a patterns 102*a*' is AC GND is obtained. Likewise, when the other ends of the plurality of second-b patterns 102*b*' are electrically connected to each other, a total impedance is reduced because capacitances for respective second-b patterns 102*b*' are added. Thus, an effect in which each of the other ends of the plurality of second-b patterns 102*b*' is AC GND is obtained.

An operation mode of the touch input device 500' in FIG. 17 will be described in detail.

In the touch driving/sensing mode, the control unit 300 may electrically connect the plurality of driving circuit units 310 to the plurality of first patterns 101A' of the sensor unit 100A' for sensing a position of a touch of an object such as a finger. The control unit 300 may control a plurality of switches to electrically connect the conductive patterns connected to the plurality of first patterns 101A' with the plurality of driving circuit units 310.

Also, the control unit 300 may electrically connect the plurality of sensing circuit units 330 for sensing a position of a touch to the plurality of third patterns 103A of the sensor unit 100A'. The control unit 300 may control a plurality of switches to electrically connect the conductive patterns connected to the plurality of third patterns 103A with the plurality of sensing circuit units 330.

In the touch driving/sensing mode, the control unit 300 simultaneously or sequentially applies a driving signal (or touch driving signal) for touch sensing to the plurality of first patterns 101A' and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the outputted voltage value to detect a touch position.

In the antenna driving mode (or stylus driving mode, or stylus uplink mode), the control unit 300 may electrically connect the plurality of driving circuit units for antenna driving to the plurality of second a patterns 102*a*' and the plurality of second b patterns 102*b*' of the sensor unit 100A'. The control unit 300 may control a plurality of switches to electrically connect the conductive patterns connected to the plurality of second-a patterns 102*a*' and the plurality of second-b patterns 102*b*' with the plurality of driving circuit units 310.

The control unit 300 may control a driving signal (or pen driving signal) outputted from each driving circuit unit 310 connected to the plurality of second-a patterns 102*a*' and the plurality of second-b patterns 102*b*'. The control unit 300 may control opposite pulse signals to be outputted from two random driving circuit units among the plurality of driving circuit units 310 electrically connected to the plurality of second-a patterns 102*a*' and the plurality of second-b patterns 102*b*'. Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of first patterns 101A' and the plurality of third patterns 103A' of the sensor unit 100A'. The control unit 300 may control a plurality of switches to electrically connect the conductive patterns connected to the plurality of first patterns 101A' and the plurality of third patterns 103A with the plurality of sensing circuit units 330.

The touch input device 500' in FIG. 17 is different from the touch input device in FIG. 12 in configuration of the plurality of first and second patterns 101A' and 102A' of the sensor unit 100A'. That is, since the plurality of first and second patterns 101A' and 102A' are obtained by dividing the first and second patterns 101A and 102A of FIG. 12 into half, the number of the plurality of first and second patterns 101A' and 103A' is two times greater than that of the first and second patterns 101A and 102A of FIG. 12.

This configuration feature has a disadvantage in that the number of channels of the touch input device 500' in FIG. 17 increases compared to the touch input device 500 in FIG. 12, but has an advantage of reducing power consumption because the pen driving signal is applied only to a specific portion at which the stylus pen is disposed in the antenna mode for driving the stylus pen.

The touch input device in FIG. 17 has a disadvantage in that the number of channels slightly increases compared to the touch input device in FIG. 12, but has an advantage in that an operating frequency bandwidth of each of the touch driving signal applied to the touch driving electrode and the pen driving signal for driving the stylus pen is widened by reducing a resistance value and a capacitance value of the sensor unit 100' because a length of each of the first pattern 101' and the second pattern 102' is reduced by half.

Figure 18:
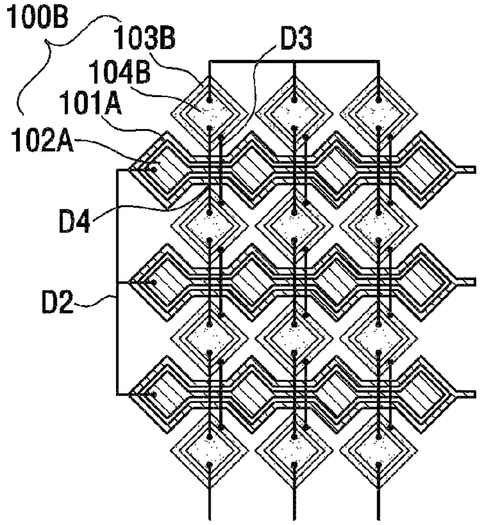
FIG. 18 is a schematic view illustrating a sensor unit according to a modified example of the sensor unit 100 and 100' in FIG. 4 or 7.

FIG. 18 is a schematic view illustrating a modified example of the sensor units 100 and 100' in FIG. 16 or 19.

A sensor unit 100B in FIG. 18 may be used as the above-described sensor units of the touch input devices according to various embodiments of the present invention. Hereinafter, a specific structure and shape of the sensor unit 100B will be described, and a description on a method for driving a touch input device including the sensor unit 100B will be replaced by the above-described features.

Referring to FIG. 18, the sensor unit 100B includes a plurality of first to fourth patterns 101A, 102A, 103B, and 104B. The plurality of first to fourth patterns 101A, 102A, 103B, and 104B are arranged together on the same layer.

The first pattern 101A has a shape extending in a first direction (width direction). The first direction may be a major axis direction of the screen of the touch input device. The first pattern 101A may also be referred to as Active TX (ATX).

The first pattern 101A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The first pattern 101A may have an opening in which the second pattern 102A is disposed. The opening may have a shape corresponding to an outer shape of the first pattern 101A. The first pattern 101A may have a structure surrounding the second pattern 102A. The first pattern 101A is spaced a predetermined distance from the second pattern 102A.

The second pattern 102A has a shape extending in the first direction, is disposed adjacent to the first pattern 101A, and is spaced a predetermined distance from the first pattern 101A. The second pattern 102A may also be referred to as Dummy TX (DTX).

The second pattern 102A is disposed in the first pattern 101A.

The second pattern 102A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the second pattern 102A may have a shape corresponding to that of the main pattern part of the first pattern 101A, and the connection pattern part of the second pattern 102A may have a shape corresponding to that of the connection pattern part of the first pattern 101A.

The other ends (second ends) of the plurality of second patterns 102A are electrically connected to each other by a second conductive pattern.

The third pattern 103B is disposed on each of upper and lower portions based on one connection pattern part of the first pattern 101A. Here, although the third pattern 103B may have a diamond shape, the embodiment of the present invention is not limited thereto. For example, the third pattern 103B may have various shapes that are different from that of the connection pattern part. The third pattern 103B may have an opening in which the fourth pattern 104B is disposed. The opening may have a shape corresponding to an outer shape of the third pattern 103B. The third pattern 103B may have a structure surrounding the fourth pattern 104B. The third pattern 103B is spaced a predetermined distance from the fourth pattern 104B. The third pattern 103B may also be referred to as Active RX (ARX), and the fourth pattern 104B may also be referred to as Dummy RX (DRX).

The third patterns arranged along the second direction perpendicular to the first direction among the plurality of third patterns 103B are electrically connected by a third conductive pattern D3. Thus, the third patterns arranged along the second direction may be electrically connected by a plurality of third conductive patterns D3 and equal to an electrical connection direction of the third pattern 103 in FIG. 4 or 7.

The third conductive pattern D3 is arranged so as to cross the connection pattern part of the first pattern 101A disposed between two adjacent third patterns.

The fourth patterns arranged along the second direction perpendicular to the first direction among the plurality of fourth patterns 104B are electrically connected by a fourth conductive pattern D4. Accordingly, the fourth patterns arranged along the second direction may be electrically connected by a plurality of fourth conductive patterns D4 and equal to an electrical connection direction of the fourth pattern 104 in FIG. 4 or 7.

The fourth conductive pattern D4 is arranged so as to cross the connection pattern part of the first pattern 101A disposed between two adjacent fourth patterns. Also, the fourth conductive pattern D4 is disposed farthest from the control unit among the plurality of fourth patterns 104B and electrically connect the fourth patterns 104B arranged in the first direction.

The plurality of first to fourth patterns 101A, 102A, 103B, and 104B may be disposed on the same first layer, and the second to fourth conductive patterns D2, D3, and D4 may be disposed on the same second layer. Here, the first layer and the second layer are physically and electrically spaced apart from each other.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

DESCRIPTION OF REFERENCE NUMERALS

100: Sensor unit
300: Control unit
101: First pattern
102: Second pattern
103: Third pattern
104: Fourth pattern

The invention claimed is:

1. A touch input device comprising a sensor unit and a control unit, wherein the sensor unit comprises:
   - a plurality of first patterns each extending in a first direction and having one ends electrically connected to the control unit;
   - a plurality of second patterns each extending in the first direction and disposed adjacent to the first patterns;
   - a plurality of third patterns each extending in a second direction perpendicular to the first direction and having one ends electrically connected to the control unit; and
   - a plurality of fourth patterns each extending in the second direction, disposed adjacent to the third patterns, and having one ends that are electrically floated and other ends that are electrically connected to each other,
   - wherein the first patterns comprise first-a patterns and first-b patterns arranged in the first direction,
   - wherein the second patterns comprise second-a patterns and second-b patterns arranged in the first direction,
   - wherein the plurality of first to fourth patterns are configured to be electrically isolated from each other,
   - wherein the control unit controls the sensor unit to operate in one of a touch driving/sensing mode for sensing a touch position of an object, an antenna driving mode for driving a stylus pen, and a stylus sensing mode for sensing a touch position of the stylus pen,
   - wherein, in the touch driving/sensing mode, the control unit applies a touch driving signal to the plurality of first patterns and receives a touch sensing signal through the plurality of third patterns,
   - in the antenna driving mode, the control unit applies a pen driving signal for driving the stylus pen to the plurality of second patterns, and
   - in the stylus sensing mode, the control unit receives a pen sensing signal from the stylus pen through any one of the plurality of first patterns and the plurality of second patterns, and any one of the plurality of third patterns and the plurality of fourth patterns.

2. The touch input device of claim 1, wherein a plurality of second-a patterns of the plurality of second patterns have the other ends that are electrically connected to each other and one ends of which two ends that are adjacent to each other in the second direction are electrically connected to each other and electrically connected to the control unit, and
   - a plurality of second-b patterns of the plurality of second patterns have the other ends that are electrically connected to each other and one ends of which two ends that are adjacent to each other in the second direction are electrically connected to each other and electrically connected to the control unit.

3. A touch input device comprising a sensor unit and a control unit, wherein the sensor unit comprises:
   - a plurality of first patterns each extending in a first direction and having one ends electrically connected to the control unit;
   - a plurality of second patterns each extending in the first direction, disposed adjacent to the first patterns, and having one ends that are electrically connected to the control unit and other ends that are electrically connected to each other;
   - a plurality of third patterns each extending in a second direction perpendicular to the first direction and having one ends electrically connected to the control unit; and
   - a plurality of fourth patterns each extending in the second direction, disposed adjacent to the third patterns, and having one ends that are electrically floated and other ends that are electrically connected to each other,
   - wherein the plurality of first to fourth patterns are configured to be electrically isolated from each other,
   - wherein the control unit controls the sensor unit to operate in one of a touch driving/sensing mode for sensing a touch position of an object, an antenna driving mode for driving a stylus pen, and a stylus sensing mode for sensing a touch position of the stylus pen,
   - wherein, in the touch driving/sensing mode, the control unit applies a touch driving signal to the plurality of first patterns and receives a touch sensing signal through the plurality of third patterns,
   - in the antenna driving mode, the control unit applies a pen driving signal for driving the stylus pen to the plurality of second patterns, and
   - in the stylus sensing mode, the control unit receives a pen sensing signal from the stylus pen through any one of the plurality of first patterns and the plurality of second patterns, and any one of the plurality of third patterns and the plurality of fourth patterns.

4. A touch input device comprising a sensor unit and a control unit, wherein the sensor unit comprises:
   - a plurality of first patterns each extending in a first direction and having one ends electrically connected to the control unit;
   - a plurality of second patterns each extending in the first direction, disposed adjacent to the first patterns, and having one ends that are electrically floated and other ends that are electrically connected to each other;
   - a plurality of third patterns each extending in a second direction perpendicular to the first direction and having one ends electrically connected to the control unit; and
   - a plurality of fourth patterns each extending in the second direction, disposed adjacent to the third patterns, and having one ends that are electrically connected to the control unit and other ends that are electrically connected to each other,
   - wherein the plurality of first to fourth patterns are configured to be electrically isolated from each other,
   - wherein the control unit controls the sensor unit to operate in one of a touch driving/sensing mode for sensing a touch position of an object, an antenna driving mode for driving a stylus pen, and a stylus sensing mode for sensing a touch position of the stylus pen, wherein, in the touch driving/sensing mode, the control unit applies a touch driving signal to the plurality of first patterns and receives a touch sensing signal through the plurality of third patterns, in the antenna driving mode, the control unit applies a pen driving signal for driving the stylus pen to the plurality of fourth patterns, and in the stylus sensing mode, the control unit receives a pen sensing signal from the stylus pen through any one of the plurality of first patterns and the plurality of second patterns, and any one of the plurality of third patterns and the plurality of fourth patterns.

5. The touch input device of claim 1, wherein each of the first and second patterns comprises a plurality of main pattern parts and a connection pattern part configured to connect two adjacent main pattern parts among the plurality of main pattern parts, the first pattern has an opening in which the second pattern is disposed, each of the third and fourth patterns comprises a plurality of main pattern parts and a connection pattern part configured to connect two adjacent main pattern parts among the plurality of main pattern parts, the third pattern has an opening in which the fourth pattern is disposed, and the first and second patterns are disposed on the third and fourth patterns.

6. The touch input device of claim 1, wherein a screen on which the sensor unit is disposed has a diagonal length of 10 inches to 13 inches.

7. The touch input device of claim 3, wherein each of the first and second patterns comprises a plurality of main pattern parts and a connection pattern part configured to connect two adjacent main pattern parts among the plurality of main pattern parts, the first pattern has an opening in which the second pattern is disposed, each of the third and fourth patterns comprises a plurality of main pattern parts and a connection pattern part configured to connect two adjacent main pattern parts among the plurality of main pattern parts, the third pattern has an opening in which the fourth pattern is disposed, and the first and second patterns are disposed on the third and fourth patterns.

8. The touch input device of claim 3, wherein a screen on which the sensor unit is disposed has a diagonal length of 10 inches to 13 inches.

9. The touch input device of claim 4, wherein each of the first and second patterns comprises a plurality of main pattern parts and a connection pattern part configured to connect two adjacent main pattern parts among the plurality of main pattern parts, the first pattern has an opening in which the second pattern is disposed, each of the third and fourth patterns comprises a plurality of main pattern parts and a connection pattern part configured to connect two adjacent main pattern parts among the plurality of main pattern parts, the third pattern has an opening in which the fourth pattern is disposed, and the first and second patterns are disposed on the third and fourth patterns.

10. The touch input device of claim 4, wherein a screen on which the sensor unit is disposed has a diagonal length of 10 inches to 13 inches.

* * * * *